US012712952B2

(12) United States Patent
Han

(10) Patent No.: US 12,712,952 B2
(45) Date of Patent: Aug. 18, 2026

(54) HINGE STRUCTURE AND ELECTRONIC DEVICE COMPRISING SAME

(71) Applicant: Samsung Electronics Co., Ltd., Suwon-si (KR)

(72) Inventor: Yonghwa Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 409 days.

(21) Appl. No.: 18/348,776

(22) Filed: Jul. 7, 2023

(65) Prior Publication Data

US 2023/0353665 A1 Nov. 2, 2023

Related U.S. Application Data

(63) Continuation of application No. PCT/KR2022/000458, filed on Jan. 11, 2022.

(30) Foreign Application Priority Data

Jan. 29, 2021 (KR) ........................ 10-2021-0013653
Mar. 17, 2021 (KR) ........................ 10-2021-0034842

(51) Int. Cl.
*H04B 1/38* (2015.01)
*F16C 11/04* (2006.01)
*H04M 1/02* (2006.01)

(52) U.S. Cl.
CPC ........... *H04M 1/0216* (2013.01); *F16C 11/04* (2013.01)

(58) Field of Classification Search
CPC .. H04M 1/0206; H04M 1/021; H04M 1/0212; H04M 1/0214; H04M 1/0216;
(Continued)

(56) References Cited

U.S. PATENT DOCUMENTS 9,176,535 B2 11/2015 Bohn et al.
9,798,359 B2 10/2017 Seo et al.
(Continued)

FOREIGN PATENT DOCUMENTS

CN 104675844 A 6/2015
CN 108712535 A 10/2018
(Continued)

OTHER PUBLICATIONS

Korean Office Action dated Mar. 7, 2025, issued in Korean Application No. 10-2021-0034842.
(Continued)

*Primary Examiner* — Tuan Pham
(74) *Attorney, Agent, or Firm* — Jefferson IP Law, LLP

(57) ABSTRACT

An electronic device is provided. The electronic device includes a first housing, a second housing, a hinge structure connected to the first housing and the second housing such that the first housing rotates about a first rotational axis and the second housing rotates about a second rotational axis, the first and second rotation axes being parallel to an axial direction, and a display covering the first housing, the second housing, and the hinge structure, the hinge structure comprising a first arm shaft extending parallel to the axial direction and rotating according to a rotation of a first rotating structure, a second arm shaft extending parallel to the axial direction and rotating according to a rotation of a second rotating structure, and a link structure moving linearly in the axial direction according to a rotation of the first and second arm shafts.

22 Claims, 20 Drawing Sheets

(58) Field of Classification Search
CPC .. H04M 1/022; H04M 1/0222; H04M 1/0233; H04M 1/0268
See application file for complete search history.

(56) References Cited

U.S. PATENT DOCUMENTS

| | | | |
|---|---|---|---|
| 9,910,458 | B2 | 3/2018 | Watanabe et al. |
| 9,921,613 | B2 | 3/2018 | Kuramochi |
| 10,120,415 | B2 | 11/2018 | Seo et al. |
| 10,303,223 | B2 | 5/2019 | Park et al. |
| 10,423,196 | B2 | 9/2019 | Seo et al. |
| 10,551,880 | B1 | 2/2020 | Al et al. |
| 10,827,633 | B2 | 11/2020 | Yoo et al. |
| 10,845,850 | B1 | 11/2020 | Kang et al. |
| 10,856,430 | B2 | 12/2020 | Yoo et al. |
| 10,963,020 | B2 | 3/2021 | Kim et al. |
| 11,032,402 | B2 | 6/2021 | Liu et al. |
| 11,032,929 | B2 | 6/2021 | Yoo et al. |
| 11,231,754 | B2 | 1/2022 | Kang et al. |
| 11,372,453 | B2 | 6/2022 | Yu et al. |
| 11,662,781 | B2 | 5/2023 | Kang et al. |
| 12,072,744 | B2 | 8/2024 | Kang et al. |
| 2016/0123054 | A1 | 5/2016 | Senatori |
| 2017/0115701 | A1* | 4/2017 | Bae .......................... G06F 1/16 |
| 2017/0351303 | A1 | 12/2017 | Kuramochi |
| 2018/0024596 | A1 | 1/2018 | Park et al. |
| 2018/0324964 | A1 | 11/2018 | Yoo et al. |
| 2019/0112852 | A1 | 4/2019 | Hsu |
| 2019/0278338 | A1 | 9/2019 | Siddiqui |
| 2020/0137908 | A1 | 4/2020 | Yoo et al. |
| 2020/0166974 | A1 | 5/2020 | Al et al. |
| 2020/0264674 | A1 | 8/2020 | Km et al. |
| 2020/0293094 | A1 | 9/2020 | Liu |
| 2020/0348732 | A1 | 11/2020 | Kang et al. |
| 2020/0352044 | A1* | 11/2020 | Hsu ...................... H05K 5/0247 |
| 2020/0375046 | A1 | 11/2020 | Sim et al. |
| 2020/0396852 | A1 | 12/2020 | Yoo et al. |
| 2021/0041921 | A1 | 2/2021 | Kang et al. |
| 2021/0165466 | A1 | 6/2021 | Kang et al. |
| 2021/0298186 | A1 | 9/2021 | Yoo et al. |
| 2021/0303032 | A1 | 9/2021 | Hong et al. |
| 2021/0307185 | A1 | 9/2021 | Hong et al. |
| 2021/0307186 | A1 | 9/2021 | Hong et al. |
| 2022/0342458 | A1 | 10/2022 | Al et al. |

FOREIGN PATENT DOCUMENTS

| | | | |
|---|---|---|---|
| CN | 109695624 | A | 4/2019 |
| CN | 111043149 | A | 4/2020 |
| CN | 211370997 | U | 8/2020 |
| CN | 112995366 | A | 6/2021 |
| JP | 2016-038040 | A | 3/2016 |
| JP | 2018-14074 | A | 1/2018 |
| JP | 2020-067907 | A | 4/2020 |
| KR | 10-2018-0010557 | A | 1/2018 |
| KR | 10-2018-0122210 | A | 11/2018 |
| KR | 10-2019-0065641 | A | 6/2019 |
| KR | 10-2019-0097898 | A | 8/2019 |
| KR | 10-2020-0094763 | A | 8/2020 |
| KR | 10-2020-0101238 | A | 8/2020 |
| KR | 10-2020-0126524 | A | 11/2020 |
| KR | 10-2020-0128330 | A | 11/2020 |
| KR | 10-2022-0050462 | A | 4/2022 |
| RU | 2 596 469 | C2 | 6/2015 |
| RU | 2 683 290 | C2 | 3/2018 |
| WO | 2022/055132 | A1 | 3/2022 |

OTHER PUBLICATIONS

Russian Office Action dated Apr. 23, 2025, issued in Russian Application No. 2023122225/07.

Extended European Search Report dated May 3, 2024, issued in European Application No. 22746110.0-1218.

Korean Notice of Allowance with English translation dated Oct. 24, 2025; Korean Appln. No. 10-2021-0034842.

Japanese Notice of Allowance with English translation dated Nov. 25, 2025; Japanese Appln. No. 2023-546149.

Indian Office Action dated Dec. 4, 2025; Indian Appln. No. 202317051353.

Chinese Office Action with English translation dated Jul. 3, 2026; Chinese Appln. 202280012474.0.

* cited by examiner

200

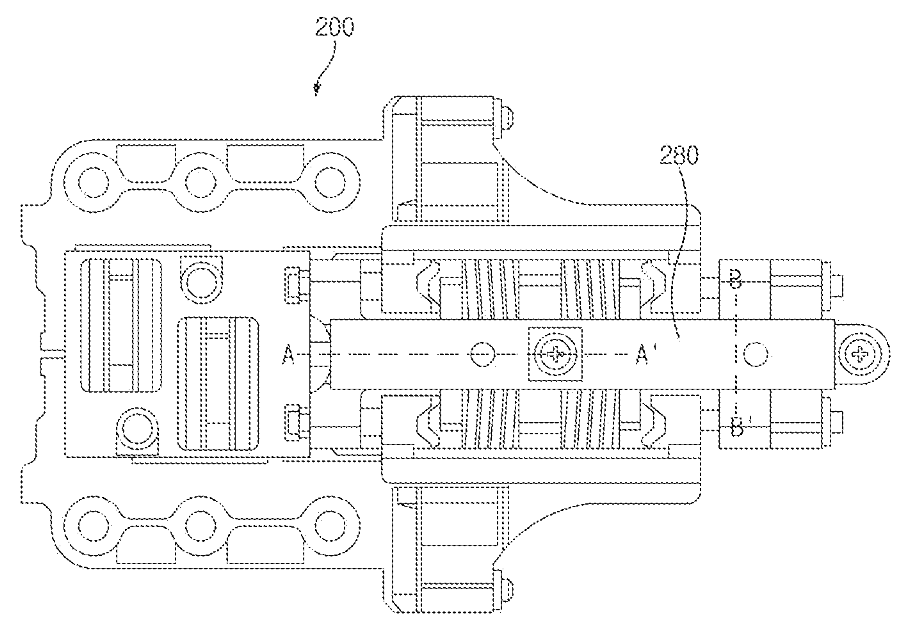
FIG.14A
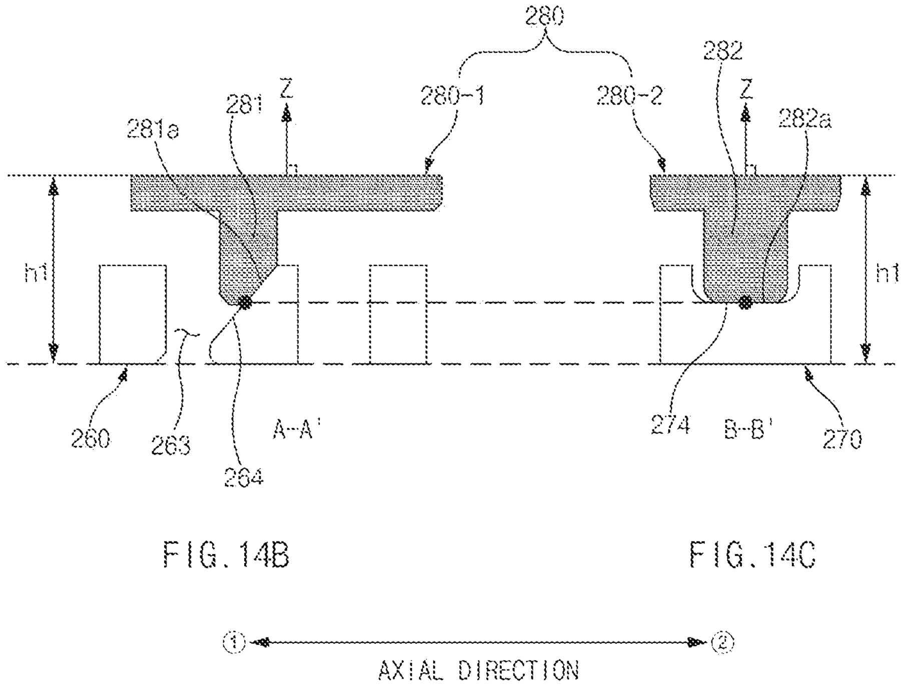
FIG.14B
FIG.14C
① ② AXIAL DIRECTION

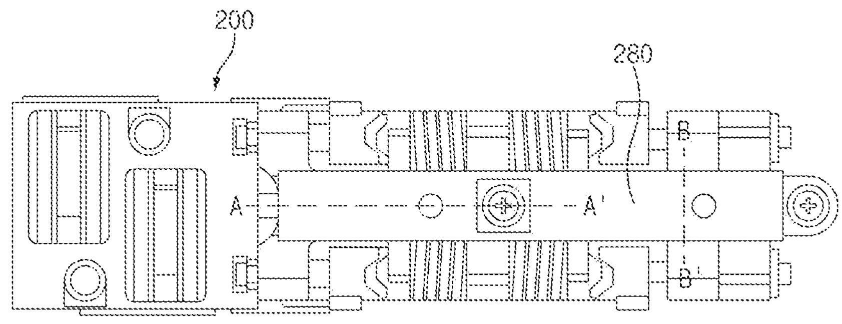
FIG.15A
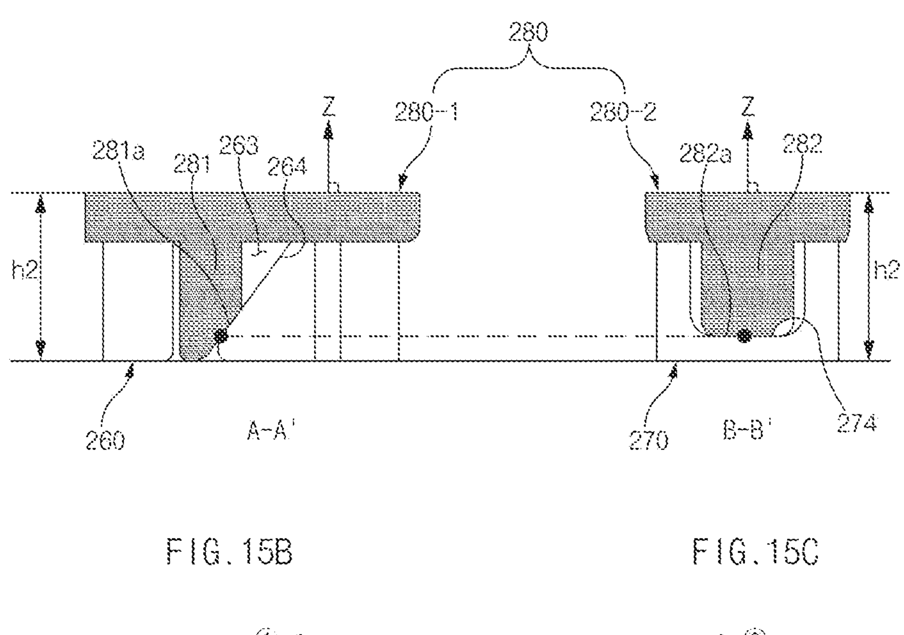
FIG.15B
FIG.15C
① ② AXIAL DIRECTION

HINGE STRUCTURE AND ELECTRONIC DEVICE COMPRISING SAME

CROSS-REFERENCE TO RELATED APPLICATION(S)

This application is a continuation application, claiming priority under § 365(c), of an International application No. PCT/KR2022/000458, filed on Jan. 11, 2022, which is based on and claims the benefit of a Korean patent application number 10-2021-0013653, filed on Jan. 29, 2021, in the Korean Intellectual Property Office, and of a Korean patent application number 10-2021-0034842, filed on Mar. 17, 2021, in the Korean Intellectual Property Office, the disclosure of each of which is incorporated by reference herein in its entirety.

BACKGROUND

1. Field

The disclosure relates to a hinge structure, and an electronic device including the same.

2. Description of Related Art

A portable electronic device such as a smartphone provides various functions, such as voice communications, replay of videos, or searches through the internet, based on various kinds of applications. A user may intend to use the various functions through a wider screen. However, as the size of the screen increases, portability may be lowered. Accordingly, a foldable electronic device including a flexible display, in which a partial area thereof is bent to a curved surface or a flat surface such that a wide screen is provided while portability is secured has been developed. The foldable electronic device includes a hinge structure, to which adjacent housings are connected to be rotated.

The above information is presented as background information only to assist with an understanding of the disclosure. No determination has been made, and no assertion is made, as to whether any of the above might be applicable as prior art with regard to the disclosure.

SUMMARY

The hinge structure includes a gear interlocking structure, in which the first housing and the second housing are connected to each other by gears such that the first housing and the second housing are folded at the same angle in opposite directions. For example, the gear interlocking structure includes a first gear corresponding to rotation of the first housing, a second gear corresponding to rotation of the second housing, and an idle gear that connects the first gear and the second gear. According to the gear interlocking structure, a backlash may occur between the engaged gears. Due to the backlash, the first housing and the second housing may not interlock with each other.

Furthermore, the hinge structure includes a center bar that supports a rear surface of the display. The center bar may be moved in correspondence to a shape of the display. The center bar may interlock with the first housing and the second housing. Then, the center bar cannot maintain a horizontal state when the first housing and the second housing do not interlock with each other.

Aspects of the disclosure are to address at least the above-mentioned problems and/or disadvantages and to provide at least the advantages described below. Accordingly, an aspect of the disclosure is to provide a hinge structure that may cause a first housing and a second housing to interlock with each other and maintain a horizontal state of a center bar by decreasing a backlash.

Additional aspects will be set forth in part in the description which follows and, in part, will be apparent from the description, or may be learned by practice of the presented embodiments.

In accordance with an aspect of the disclosure, an electronic device is provided. The electronic device includes a first housing, a second housing, a hinge structure connected to the first housing and the second housing such that the first housing is rotated about a first rotation axis parallel to an axial direction thereof and the second housing is rotated about a second rotation axis that is parallel to the axial direction, and a display covering the first housing, the second housing, and the hinge structure, in which the display includes a folding area that is flat in an unfolded state and curved in a folded state.

The hinge structure includes a first arm shaft extending in a direction that is parallel to the axial direction, connected to a fixing structure to be rotatable, and rotated in correspondence to rotation of the first rotation structure, a second arm shaft extending in a direction that is parallel to the axial direction, connected to the fixing structure to be rotatable, and rotated in correspondence to rotation of the second rotation structure, a link structure including a first part coupled to the first arm shaft, a second part coupled to the second arm shaft, and a central part connecting the first part and the second part, and configured to be linearly moved in the axial direction according to rotation of the first arm shaft and the second arm shaft, and a center bar at least partially overlapping the folding area of the display when viewed from above, wherein the center bar is coupled to the link structure and is configured to be moved in a direction that is perpendicular to the axial direction in correspondence to linear movement of the link structure.

In accordance with another aspect of the disclosure, a hinge structure is provided. The hinge structure includes a fixing structure, a first rotation structure coupled to a first guide rail of the fixing structure to be rotated about a first rotation axis, a first arm shaft extending in a direction that is parallel to the first rotation axis and connected to the fixing structure to be rotatable, wherein the first arm shaft includes a first guide pin protruding from an outer surface thereof, a first arm part coupled to the first arm shaft to be rotated about the first arm shaft, and connected to the first rotation structure to be slid, a second rotation structure coupled to a second guide rail of the fixing structure to be rotated about a second rotation axis, a second arm shaft extending in a direction that is parallel to the second rotation axis and connected to the fixing structure to be rotatable, wherein the second arm shaft includes a third guide pin protruding from an outer surface thereof, a second arm part coupled to the second arm shaft to be rotated about the second arm shaft, and connected to the second rotation structure to be slid, and a link structure including a first part, in which a first guide groove, through which the first arm shaft passes and in which the first guide pin is at least partially accommodated, is formed, a second part, in which a second guide groove, through which the second arm shaft passes and in which the third guide pin is at least partially accommodated, is formed, and a central part connecting the first part and the second part.

The hinge structure according to embodiments of the disclosure may alleviate a phenomenon, in which the first housing and the second housing fail to interlock with each other by providing an improved backlash as compared with a gear interlocking structure.

The hinge structure according to embodiments disclosed in the disclosure includes the link structure that causes the first housing and the second housing to interlock with each other while being moved in the axial direction in the folding operation and the unfolding operation, and is configured such that the center bar is moved in conjunction with movement of the link structure whereby the center bar may maintain a horizontal state even when the first housing and the second housing are tilted.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 14A is a view illustrating a link structure of a hinge structure in an unfolded state according to an embodiment of the disclosure, FIG. 14B is a view taken along line A-A' in 14A, and FIG. 14C is a view taken along line B-B' in 14A;

FIG. 15A is a view illustrating a link structure of a hinge structure in a fully folded state according to an embodiment of the disclosure, FIG. 15B is a view taken along line A-A' in 15A, and FIG. 15C is a view taken along line B-B' in 15A;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

Figure 1:
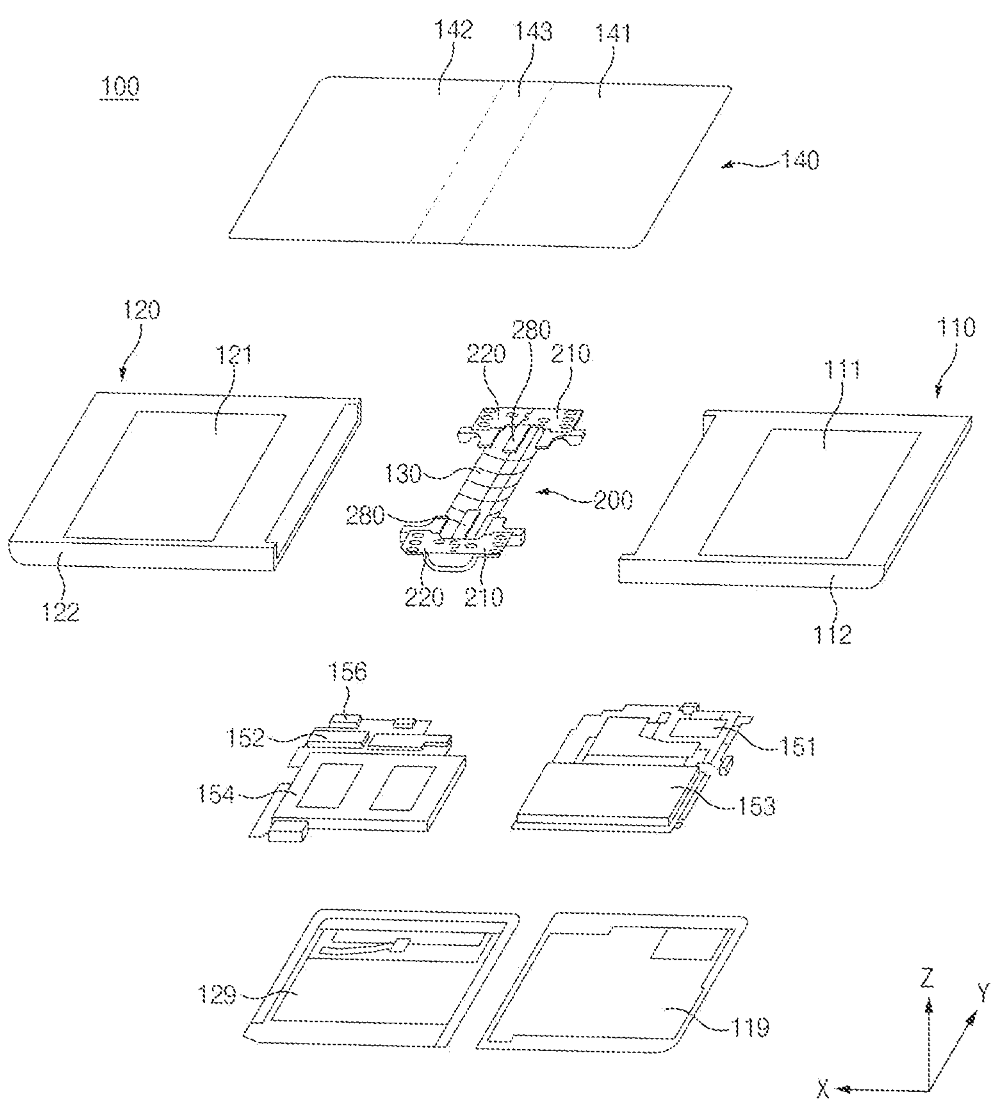
FIG. 1 is an exploded perspective view of an electronic device according to an embodiment of the disclosure.

FIG. 1 is an exploded perspective view of an electronic device according to an embodiment of the disclosure.

Referring to FIG. 1, an electronic device 100 may include a first housing 110, a second housing 120, a hinge housing 130, a hinge structure 200, and a display 140.

In an embodiment, the first housing 110 may be connected to the second housing 120 by using the hinge structure 200. The first housing 110 may include a first plate 111, on which the display 140 is seated, and a first frame 112 that surrounds at least a portion of the first plate 111. For example, the first frame 112 may define a portion of a surface (e.g., a side surface) of the electronic device 100. For example, portions of a first area 141 and a folding area 143 of the display 140 may be disposed in the first plate 111. A first rotation structure 210 of the hinge structure 200 may be connected to the first plate 111. In an embodiment, at least a portion of the first housing 110 may be bonded to the first area 141 of the display 140. Alternatively, a portion of a periphery of a front surface of the first housing 110 may be bonded to a periphery of the first area 141 of the display 140. In this regard, a bonding layer may be disposed between the first plate 111 of the first housing 110 and the first area 141 of the display 140.

In an embodiment, at least a portion of an inside of the first housing 110 may have a hollow shape. A first circuit board 151, a first battery 153, and a camera module 156 may be disposed in an interior of the first housing 110. The first circuit board 151 and the first battery 153 may be electrically connected to a second circuit board 152 and a second battery 154, which are disposed in an interior of the second housing 120, through a flexible board. For example, a processor and a memory may be disposed in the first circuit board 151. For example, the first battery 153 and the first circuit board 151 may be disposed in the first plate 111. In an embodiment, at least a portion of the first housing 110, for example, may be formed of a metallic material, or at least a portion thereof may be formed of a nonmetallic material. The first housing 110 may be formed of a material having a strength of a specific magnitude to support at least a portion of the display 140. In an embodiment, at least a portion of a part of the first housing 110, which faces the second housing 120, may have a recessed portion having a specific curvature such that the hinge housing 130 is disposed therein.

In various embodiments, the first housing 110 may include a first rear cover 119 that defines a surface of the electronic device 100 while facing the first plate 111. For example, the first rear cover 119 may define the rear surface of the electronic device 100 in the unfolded state (e.g., FIG. 2A), and the display 140 may define the front surface of the electronic device.

In an embodiment, the second housing 120 may be connected to the first housing 110 through the hinge structure 200. The second housing 120 may include a second plate 121, on which the display 140 is seated, and a second frame 122 that surrounds at least a portion of the second plate 121. For example, the second frame 122 may define a portion of a surface (e.g., the side surface) of the electronic device 100. For example, portions of a second area 142 and the folding area 143 may be disposed in the second plate 121. A second rotation structure 220 of the hinge structure 200 may be connected to the second plate 121. In an embodiment, at least a portion of the second housing 120 may be bonded to the second area 142 of the display 140. Alternatively, a portion of a periphery of a front surface of the second housing 120 may be bonded to a periphery of the second area 142 of the display 140. In this regard, a bonding layer may be disposed between the second plate 121 of the second housing 120 and the second area 142 of the display 140.

In an embodiment, at least a portion of an inside of the second housing 120 may have a hollow shape. The second circuit board 152 and the second battery 154 may be disposed in an interior of the second housing 120. The second circuit board 152 and the second battery 154 may be electrically connected to the first circuit board 151 and/or the first battery 153, which are disposed in an interior of the first housing 110, through the flexible board. For example, the second battery 154 and the second circuit board 152 may be disposed in the second plate 121. In an embodiment, at least a portion of the second housing 120, for example, may be formed of a metallic material, or at least a portion thereof may be formed of a nonmetallic material. The second housing 120 may be formed of a material having a strength of a specific magnitude to support at least a portion of the display 140. In an embodiment, at least a portion of a part of the second housing 120, which faces the first housing 110, may have a recessed portion having a specific curvature such that the hinge housing 130 is disposed therein.

In various embodiments, the second housing 120 may include a second rear cover 129 that defines a surface of the electronic device 100 while facing the second plate 121. For example, the second rear cover 129 may define the rear surface of the electronic device 100 in the unfolded state (e.g., FIG. 2A), and the display 140 may define the front surface of the electronic device.

In various embodiments, a lattice structure (not illustrated) and/or a bracket (not illustrated) disposed between the display 140 and the bonding layer may be further included. The lattice structure may include a slit area including a plurality of slits that at least partially overlap each other, in the folding area 143. The plurality of slits may extend long in an extension direction (e.g., the −y axis) of the folding area 143. The plurality of slits may support the folding area 143 that is a flat surface in the unfolded state (e.g., FIG. 2A), and may be configured such that the folding area 143 is deformed in a folding operation or an unfolding operation. In various embodiments, only a portion of the lattice structure or the bracket may be stacked on the display 140.

In an embodiment, the hinge housing 130 may be disposed in the recessed portions of the first housing 110 and the second housing 120. The hinge housing 130 may have a shape that extends long in the y axis direction as a whole. A boss for fixing the hinge structure 200 may be disposed in a partial area of an inner surface of the hinge housing 130.

In an embodiment, at least a portion of the display 140 may be flexible. For example, the display 140 may include the first area 141 disposed on the first housing 110, the second area 142 disposed on the second housing 120, and the folding area 143 located between the first area 141 and the second area 142. In an embodiment, the first area 141 and the second area 142 may be flat, and the folding area 143 may be formed to be deformed to be flat or curved.

In various embodiments, the hinge structure 200 may include the first rotation structure 210 connected to the first housing 110, and the second rotation structure 220 connected to the second housing 120. The hinge structure 200 may be configured such that the first rotation structure 210 and the second rotation structure 220 are rotated about rotation axes (e.g., imaginary axes that are parallel to the y axis direction) thereof. For example, when the first housing 110 and the second housing 120 are folded or unfolded, the first rotation structure 210 and the second rotation structure 220 may be rotated about the rotation axes, respectively.

In various embodiments, the hinge structure 200 may include a center bar 280 that at least partially overlaps the folding area 143 of the display 140 when viewed in the z axis direction. The center bar 280 may support a rear surface of the folding area 143 such that the folding area 143 is maintained flatly in the unfolded state, and may be moved in the −z axis direction not to contact the folding area 143 in the folding operation.

Figure 2A:
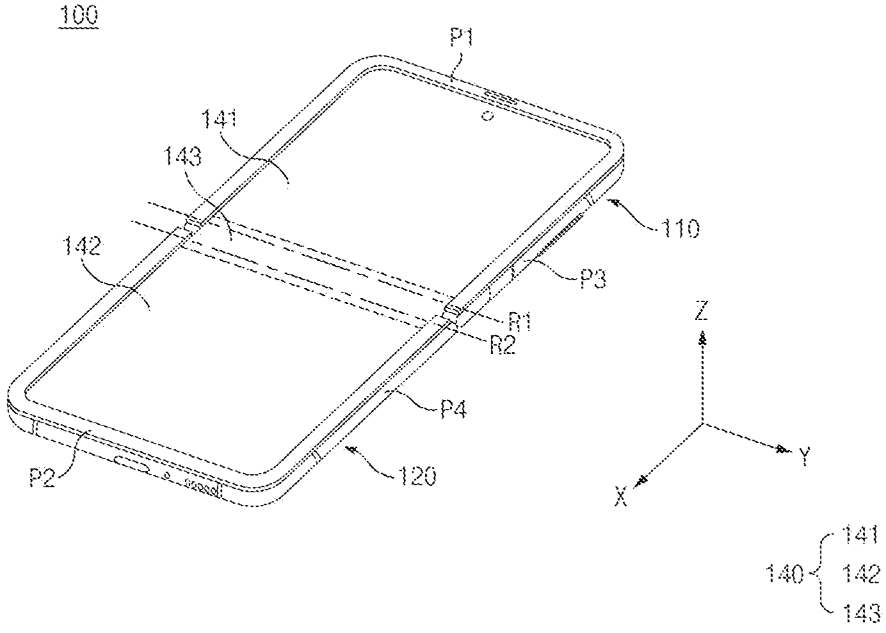
FIG. 2A is a view illustrating an unfolded state of an electronic device according to an embodiment of the disclosure.
Figure 2A:
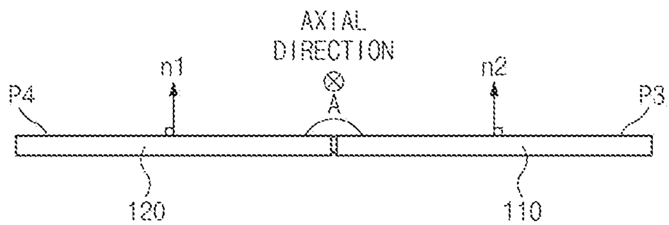
Figure 2B:
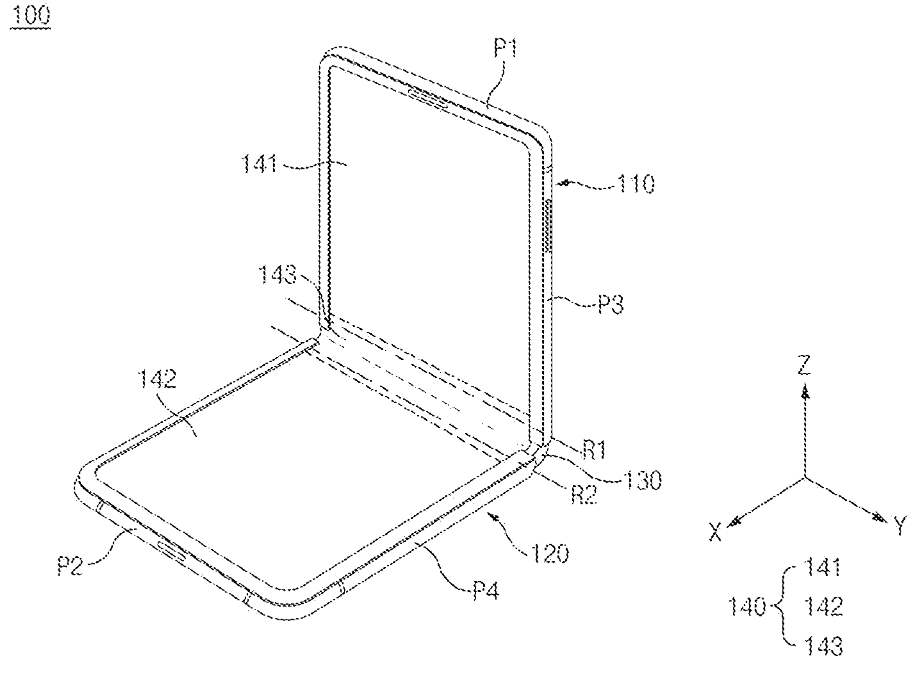
FIG. 2B is a view illustrating a folded state of an electronic device according to an embodiment of the disclosure.
Figure 2B:
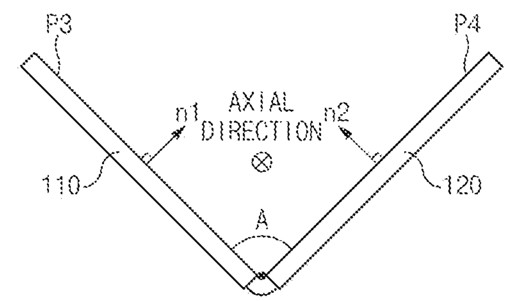
Figure 2C:
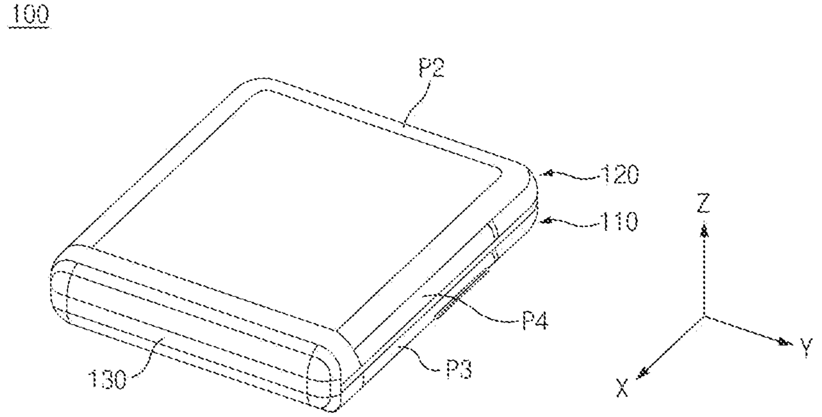
FIG. 2C is a view of a fully folded state of an electronic device according to an embodiment of the disclosure.
Figure 2C:
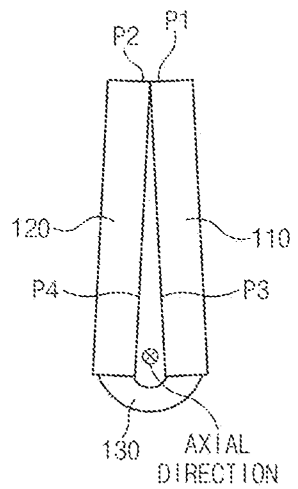

FIG. 2A is a view illustrating an unfolded state of an electronic device according to an embodiment of the disclosure. FIG. 2B is a view illustrating a folded state of an electronic device according to an embodiment of the disclosure. FIG. 2C is a view of the fully folded state of the electronic device according to an embodiment of the disclosure.

In an embodiment, the first housing 110 and the second housing 120 may be rotated about the rotation axes thereof in opposite directions. For example, in the folding operation performed from the unfolded state, the first housing 110 may be rotated in the clockwise direction, and the second housing 120 may be rotated in the counterclockwise direction.

In an embodiment, an axial direction that is parallel to the rotation axes of the first housing 110 and the second housing 120 may be defined. The axial direction may be defined as an extension direction of the folding area 143 of the display 140. For example, the axial direction may be defined as a long-side direction of the folding area 143. For example, the axial direction may mean a direction that is parallel to the y axis of FIG. 1.

To describe the states of the electronic device according to an embodiment of the disclosure, a first periphery P1 of the electronic device 100 and a second periphery P2 of the electronic device 100, which are parallel to the axial direction may be defined. To describe the states of the electronic device 100, a third periphery P3 of the electronic device 100 and a fourth periphery P4 of the electronic device 100, which are perpendicular to the axial direction, may be defined. For example, the first periphery P1 and the third periphery P3 may include a portion of the first frame 112 of the first housing 110. For example, the second periphery P2 and the fourth periphery P4 may include a portion of the second frame 122 of the second housing 120.

The unfolded state of the electronic device will be described with reference to FIG. 2A.

For example, the unfolded state may include a state, in which the folding area 143 of the display 140 is flat. For example, the unfolded state may include a state, in which the first area 141 and the second area 142 of the display 140 are on a plane that faces the same direction. For example, the unfolded state may include a state, in which a first normal vector n1 of the first area 141 and a second normal vector n2 of the second area 142 of the display 140 are parallel to each other. For example, the unfolded state may include a state, in which the third periphery P3 and the fourth periphery P4 define a substantially one line. For example, the unfolded state may include a state, in which the third periphery P3 and the fourth periphery P4 define 180 degrees.

The folded state of the electronic device will be described with reference to FIG. 2B.

For example, the folded state may include a state, in which the folding area 143 of the display 140 is curved. For example, the folded state may include a state, in which the first normal vector n1 of the first area 141 and the second normal vector n2 of the second area 142 define a specific angle. For example, the folded state may include a state, in which the third periphery P3 and the fourth periphery P4 define a specific angle other than 180 degrees.

The fully folded state of the electronic device will be described with reference to FIG. 2C.

For example, the fully folded state may mean a state, in which the first periphery P1 and the second periphery P2 substantially contact each other in the folded state. For example, the folding area 143 in the fully folded state may have a curved surface having a curvature that is larger than that of the folding area 143 in the folded state.

Referring to FIGS. 2B and 2C, in the folded state and the fully folded state, at least a portion of the hinge housing 130 may define a surface of the electronic device 100. For example, the hinge housing 130 may be visually exposed between the first housing 110 and the second housing 120.

Figure 3:
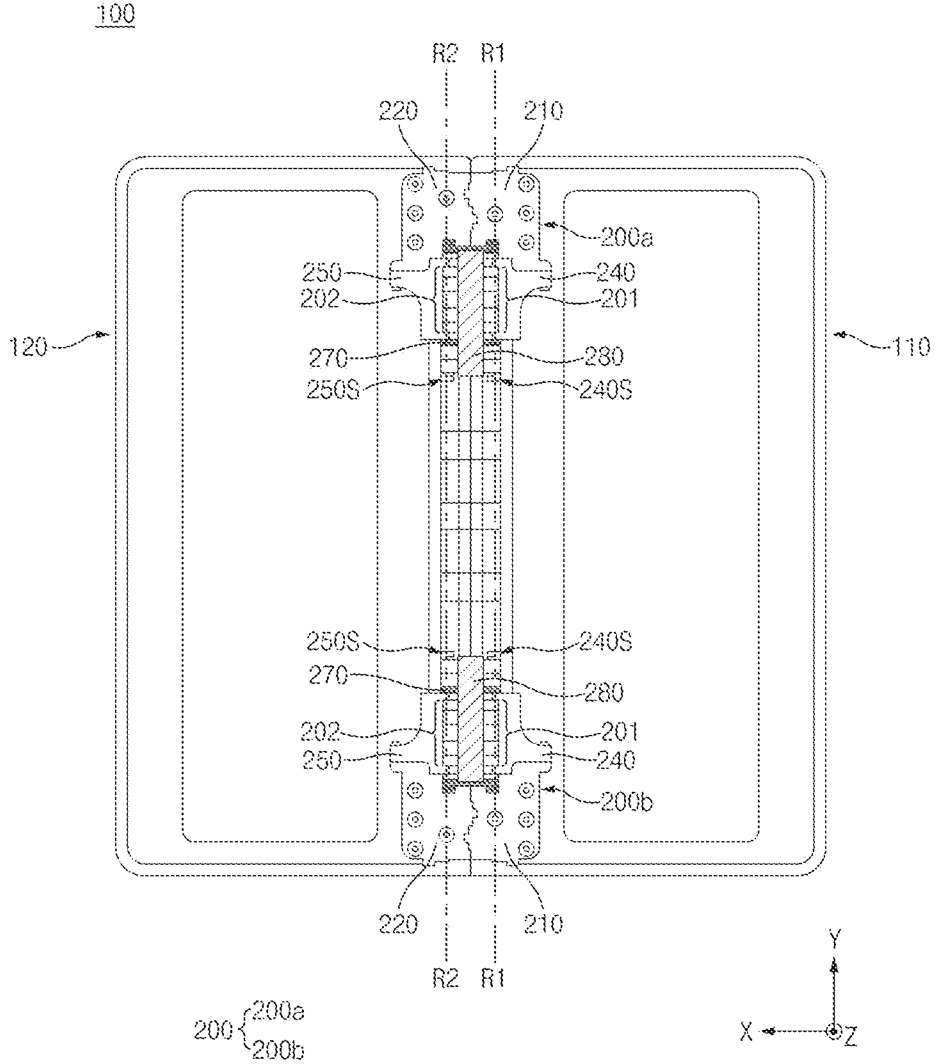
FIG. 3 is a view illustrating a first housing, a second housing, and a hinge structure of an electronic device according to an embodiment of the disclosure.

FIG. 3 is a view illustrating a first housing, a second housing, and a hinge structure of an electronic device according to an embodiment of the disclosure.

In an embodiment, the electronic device 100 may include the hinge structure 200 that is connected to the first housing 110 and the second housing 120. For example, in an embodiment, the hinge structure 200 may connect the first housing 110 and the second housing 120 such that the first housing 110 and the second housing 120 are rotated about a first rotation axis R1 and a second rotation axis R2.

In an embodiment, the hinge structure 200 may include a first hinge structure 200*a*, and a second hinge structure 200*b* that is spaced apart from the first hinge structure 200*a* in an axial direction (e.g., the y axis direction).

In an embodiment, the first rotation structure 210 of the hinge structure 200 may be connected to the first housing 110. For example, when the first housing 110 is folded or unfolded, the first rotation structure 210 may be rotated about the first rotation axis R1.

In an embodiment, the second rotation structure 220 of the hinge structure 200 may be connected to the second housing 120. For example, when the second housing 120 is folded or unfolded, the second rotation structure 220 may be rotated about the second rotation axis R2.

In an embodiment, the hinge structure 200 may further include a first arm shaft 240S, a first arm part 240, a second arm shaft 250S, a second arm part 250, a first torque structure 201, a second torque structure 202, link structures 260 and 270, and the center bar 280.

In an embodiment, the first arm part 240 may be coupled to the first arm shaft 240S to be rotated about the first arm shaft 240S. The first arm part 240 may interwork with rotation of the first rotation structure 210. For example, as the first rotation structure 210 is rotated about the first rotation axis R1 in the unfolding operation or the folding operation, the first arm part 240 may be rotated about the first arm shaft 240S together with the first arm shaft 240S.

In an embodiment, the second arm part 250 may be coupled to the second arm shaft 250S to be rotated about the second arm shaft 250S. The second arm part 250 may interwork with rotation of the second rotation structure 220. For example, as the second rotation structure 220 is rotated about the second rotation axis R2 in the unfolding operation or the folding operation, the second arm part 250 may be rotated about the second arm shaft 250S together with the second arm shaft 250S. In an embodiment, a first link structure 260 may cause rotations of the first housing 110 and the second housing 120 to interwork with each other. The first link structure 260 may cause rotations of the first arm shaft 240S and the second arm shaft 250S to interlock with each other when the first housing 110 and the second housing 120 are rotated in opposite directions. For example, the first link structure 260 may be configured to be moved in the axial direction in correspondence to rotations of the first arm shaft 240S and the second arm shaft 250S.

In an embodiment, in the folding operation and the unfolding operation, the center bar 280 may be moved in the z/−z axis direction. The center bar 280 may support a rear surface of the folding area 143 such that the folding area (e.g., the folding area 143 of FIG. 2A) of the display (e.g., the display 140 of FIG. 2A) is maintained on a plane in the unfolded state. The center bar 280 may be moved in the −z axis direction in the folding operation to define a space, in which a portion of the folding area 143 of the display 140 is accommodated. In an embodiment, the center bar 280 may be moved in correspondence to movement of the link structures 260 and 270.

In an embodiment, the hinge structure 200 may include the first torque structure 201 that provides a frictional torque to the first arm shaft 240S. The first torque structure 201 may include cam structures and an elastic member, and the elastic member may be compressed by the cam structures to form a frictional torque that is applied in an opposite direction to a rotational direction of the first arm shaft 240S. The first torque structure 201 may prevent a folding operation or an unfolding operation of the electronic device, which is not intended, by providing a suitable frictional torque to the first arm shaft 240S.

In an embodiment, the hinge structure 200 may include the second torque structure 202 that provides a frictional torque to the second arm shaft 250S. The second torque structure 202 may include cam structures and an elastic member, and the elastic member may be compressed by the cam structures to form a frictional torque that is applied in an opposite direction to a rotational direction of the second arm shaft 250S. The second torque structure 202 may prevent a folding operation or an unfolding operation of the electronic device, which is not intended, by providing a suitable frictional torque to the second arm shaft 250S.

Figure 4:
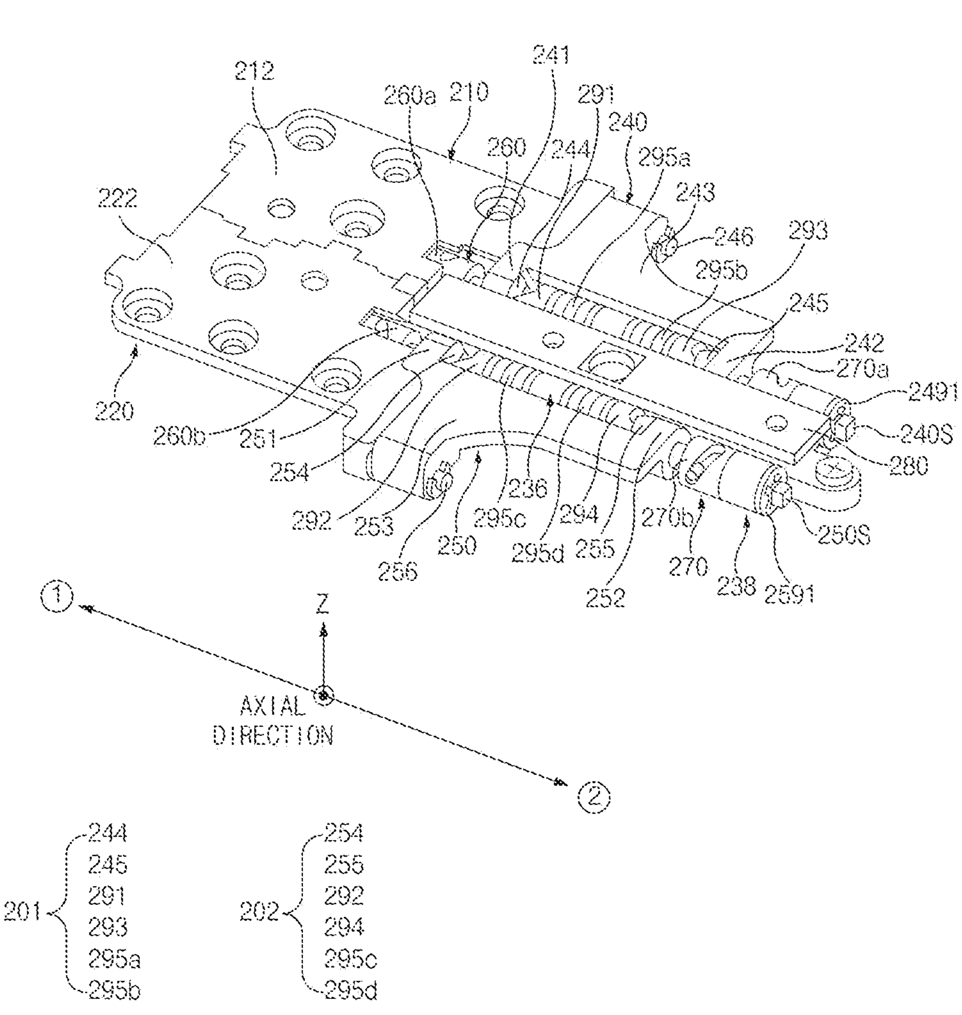
FIG. 4 is a perspective view of a hinge structure according to an embodiment of the disclosure.
Figure 5:
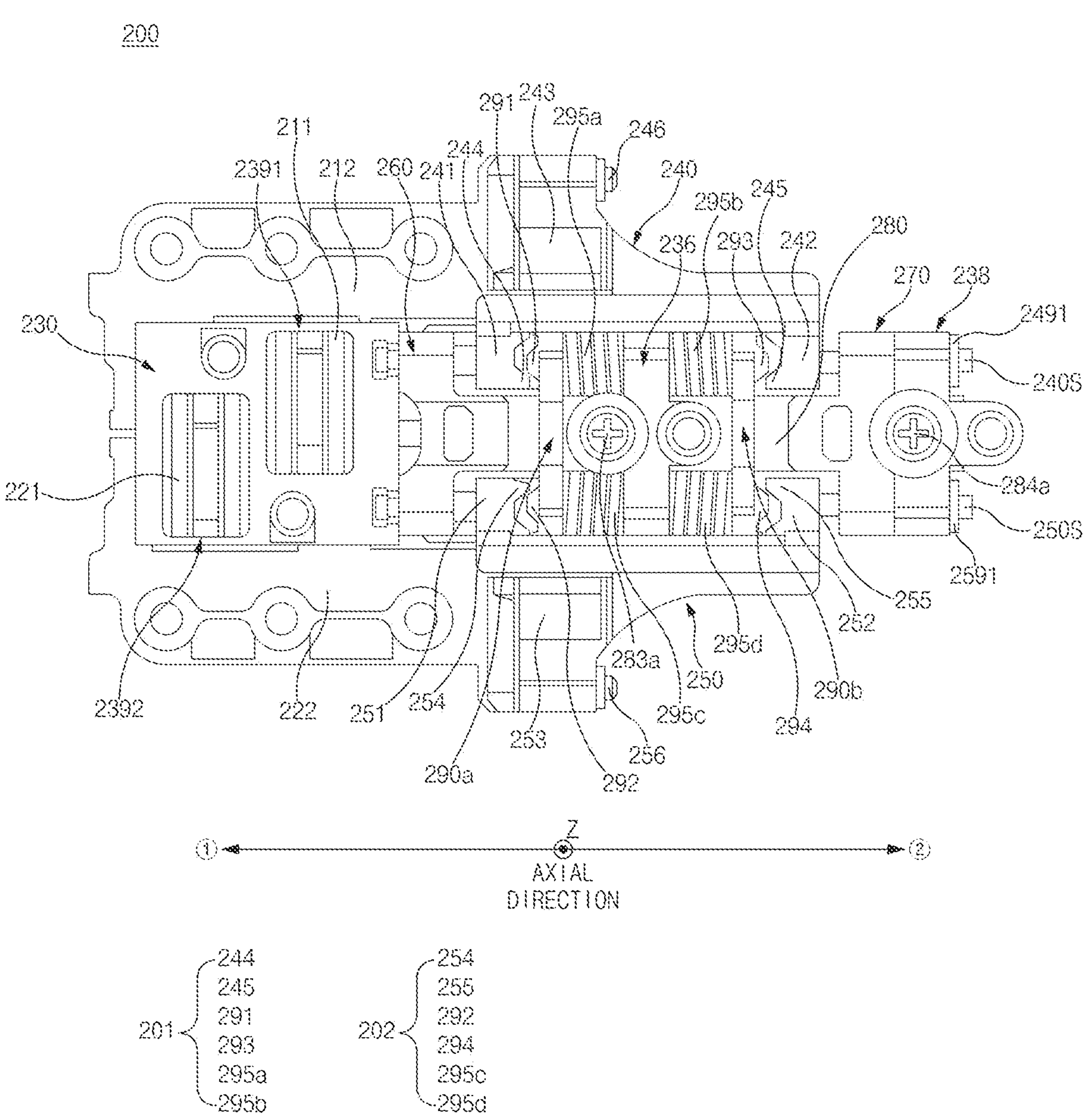
FIG. 5 is a rear view of a hinge structure according to an embodiment of the disclosure.
Figure 6:
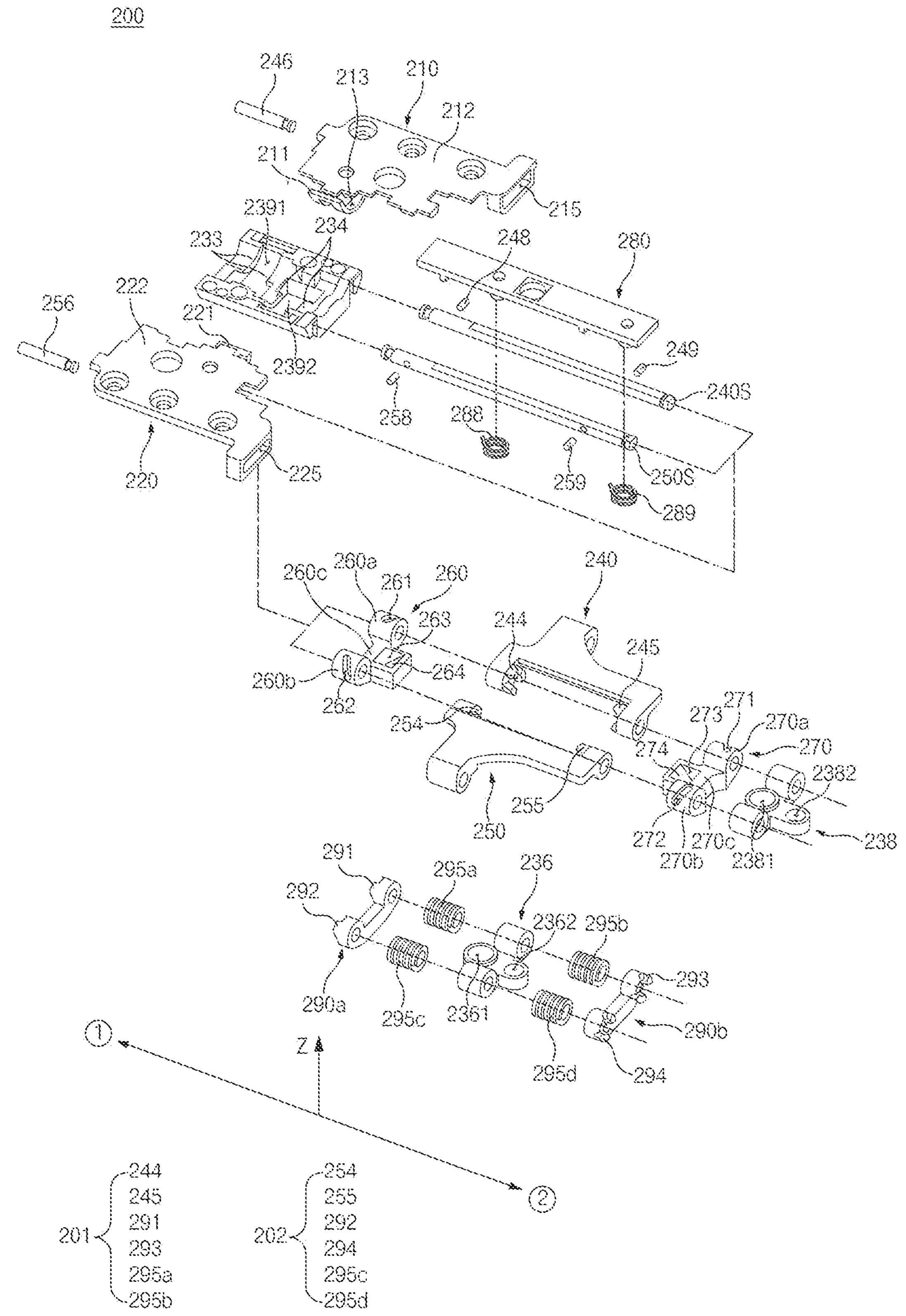
FIG. 6 is an exploded perspective view of a hinge structure according to an embodiment of the disclosure.
Figure 7:
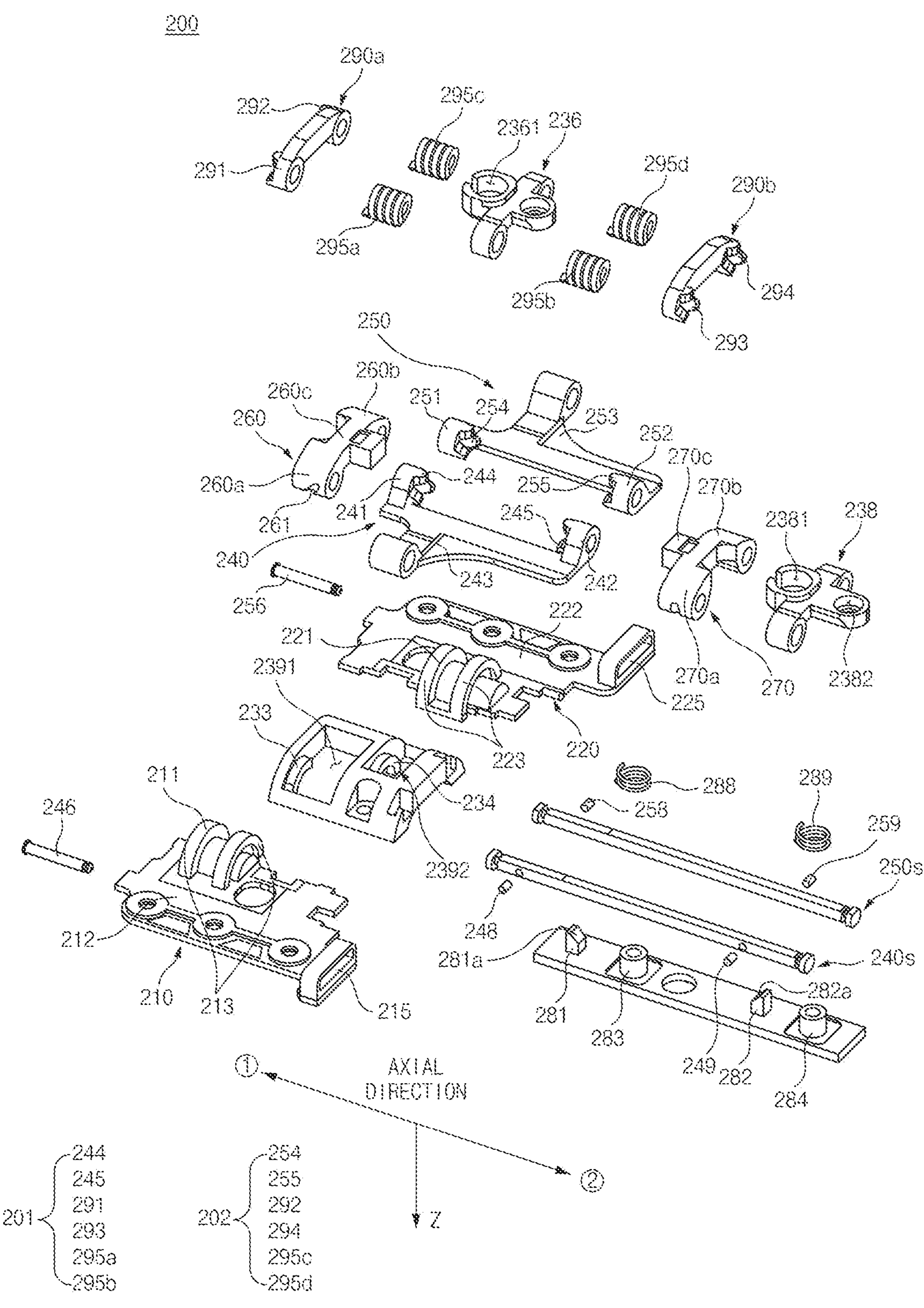
FIG. 7 is an exploded perspective view of a hinge structure according to an embodiment of the disclosure.

FIG. 4 is a perspective view of the hinge structure according to an embodiment of the disclosure. FIG. 5 is a rear view of the hinge structure according to an embodiment of the disclosure. FIG. 6 is an exploded perspective view of the hinge structure according to an embodiment of the disclosure. FIG. 7 is an exploded perspective view of the hinge structure according to an embodiment of the disclosure.

Referring to FIGS. 4 to 7, the axial direction may be defined. The axial direction may be a direction that is parallel to extension directions of the first rotation axis R1 and the second rotation axis R2. A first axial direction ① may be a direction that faces a fixing structure 230, and a second axial direction ② may be a direction that faces a second fixing member 238.

In an embodiment, the hinge structure 200 may include the fixing structure 230, the first rotation structure 210, the second rotation structure 220, a first fixing member 236, the second fixing member 238, the first arm shaft 240S, the second arm shaft 250S, the link structures 260 and 270, the first arm part 240, the second arm part 250, the first torque structure 201, and the second torque structure 202.

In an embodiment, at least a portion of the fixing structure 230 may be fixedly disposed in an interior of the hinge housing (e.g., the hinge housing 130 of FIG. 1). The first rotation structure 210 and the second rotation structure 220 may be coupled to the fixing structure 230 to be rotated.

In an embodiment, the fixing structure 230 may include a first opening area 2391, to which a first guide part 211 of the first rotation structure 210 is coupled. In an embodiment, the fixing structure 230 may include a first guide rail 233 that guides a rotation path of the first rotation structure 210. For example, the first guide rail 233 may be formed on a side wall of the first opening area 2391. For example, the first guide rail 233 may be formed on at least one of opposite side walls of the first opening area 2391, which faces the axial direction of the first opening area 2391. In an embodiment, a first protrusion 213 of the first rotation structure 210 may be accommodated in the first guide rail 233.

In an embodiment, the fixing structure 230 may include a second opening area 2392, to which a second guide part 221 of the second rotation structure 220 is coupled. In an embodiment, the fixing structure 230 may include a second guide rail 234 that guides a rotation path of the second rotation structure 220. For example, the second guide rail 234 may be formed on a side wall of the second opening area 2392. For example, the second guide rail 234 may be formed on at least one of opposite side walls of the second opening area 2392, which faces the axial direction of the second opening area 2392. In an embodiment, a second protrusion 223 of the second rotation structure 220 may be accommodated in the second guide rail 234.

In an embodiment, the first fixing member 236 and the second fixing member 238 may be fixedly disposed in the hinge housing 130. The center bar 280 may be coupled to the first fixing member 236 and the second fixing member 238.

For example, a first fixing hole 2362 and a first hole 2361 may be formed in the first fixing member 236. The first fixing member 236 may be fixedly coupled to the hinge housing (e.g., the hinge housing 130 of FIG. 1) through the first fixing hole 2362 and a coupling member inserted into the first fixing hole 2362. For example, the coupling member may include a screw. For example, the screw may extend to the hinge housing 130 through the first fixing hole 2362. For example, the first fixing member 236 may be coupled to the center bar 280 through the first hole 2361. A first protruding part 283 of the center bar 280 may be at least partially inserted into the first hole 2361. Referring to FIGS. 5 and 7, the first protruding part 283 of the center bar 280 and a first screw 283*a* coupled to the first protruding part 283 may be inserted into the first hole 2361 of the first fixing member 236.

For example, a second fixing hole 2382 and a second hole 2381 may be formed in the second fixing member 238. The second fixing member 238 may be fixedly coupled to the hinge housing 130 through the second fixing hole 2382 and a coupling member inserted into the second fixing hole 2382. For example, the coupling member may include a screw. For example, the screw may extend to the hinge housing 130 through the second fixing hole 2382. For example, the second fixing member 238 may be coupled to the center bar 280 through the second hole 2381. A second protruding part 284 of the center bar 280 may be at least partially inserted into the second hole 2381. Referring to FIGS. 5 and 7, the second protruding part 284 of the center bar 280 and a second screw 284*a* coupled to the second protruding part 284 may be inserted into the second hole 2381 of the second fixing member 238.

In an embodiment, the first arm shaft 240S and the second arm shaft 250S may pass through the first fixing member 236, and the first fixing member 236 may support rotations of the first arm shaft 240S and the second arm shaft 250S. In an embodiment, the first arm shaft 240S and the second arm shaft 250S may pass through the second fixing member 238, and the second fixing member 238 may support rotations of the first arm shaft 240S and the second arm shaft 250S.

In an embodiment, the first rotation structure 210 may be configured to be rotated in a specific path with respect to the fixing structure 230 fixedly disposed in the hinge housing (e.g., the hinge housing 130 of FIG. 1) when the first housing (e.g., the first housing 110 of FIG. 1) is folded or unfolded. In an embodiment, the first rotation structure 210 may include the first guide part 211 coupled to the fixing structure 230 to be rotated, and a first connection part 212 coupled to the first housing 110. The first connection part 212 may be folded or unfolded together with the first housing 110 when the electronic device 100 is folded or unfolded. In an embodiment, the first rotation structure 210 may include the first protrusion 213 that is formed in the first guide part 211. The first protrusion 213 may guide the rotation path of the first rotation structure 210 together with the first guide rail 233.

In an embodiment, the first arm part 240 may include a first coupling part 241, a second coupling part 242, and a first extending part 243. In an embodiment, the first arm part 240 may be coupled to the first rotation structure 210 through a first sliding pin 246 to be slid. The first arm part 240 may be coupled to the first arm shaft 240S to be rotated together with the first arm shaft 240S through the first coupling part 241 and the second coupling part 242. For example, the first coupling part 241 and the second coupling part 242 may be press-fitted with the first arm shaft 240S.

In an embodiment, in relation to sliding of the first arm part 240, the first sliding pin 246 of the first extending part 243 may be coupled to the first rotation structure 210. For example, at least a portion of the first sliding pin 246 may be accommodated in a first sliding groove 215 of the first rotation structure 210. For example, the first sliding pin 246 may be moved along the first sliding groove 215 when the first rotation structure 210 is rotated. In an embodiment, when the first rotation structure 210 is rotated about the first rotation axis R1, the first arm part 240 may be rotated about the first arm shaft 240S, and the first arm part 240 may be slid with respect to the first rotation structure 210 at the same time. For example, the first arm part 240 may be slid while the first sliding pin 246 is coupled to the first rotation structure 210.

In an embodiment, the first arm shaft 240S may be coupled to the fixing structure 230 to be rotated. For example, the first arm shaft 240S may extend long from the fixing structure 230 in the second axial direction ②. The first arm shaft 240S may extend to pass through the first fixing member 236 and the second fixing member 238. For example, rotation of the first arm shaft 240S may be supported by the first fixing member 236 and the second fixing member 238. For example, an end of the first arm shaft 240S in the first axial direction ① may be inserted into a recess or an opening formed in the fixing structure 230 to be rotated. Referring to FIGS. 4 and 5, a first fixing ring 2491 may be coupled to an end of the first arm shaft 240S in the second axial direction ②. The first fixing ring 2491 may be configured to restrict movement of the first arm shaft 240S in the axial direction. The first fixing ring 2491 may be at least partially inserted into a groove formed on an outer peripheral surface of the first arm shaft 240S. For example, the first fixing ring 2491 may include a C-clip that surrounds at least a portion of the first arm shaft 240S. In an embodiment, the first arm shaft 240S may pass through the first coupling part 241 and the second coupling part 242 of the first arm part 240. For example, the first arm shaft 240S may be coupled to the first coupling part 241 and the second coupling part 242 to be rotated together with the first coupling part 241 and the second coupling part 242. For example, the first coupling part 241 and the second coupling part 242 may be press-fitted by the first arm shaft 240S.

In this way, when the first rotation structure 210 is rotated, the first arm part 240 may be rotated by the first sliding pin 246. When the first arm part 240 is rotated, the first arm shaft 240S may be rotated by the first coupling part 241 and the second coupling part 242.

In an embodiment, the second rotation structure 220 may be configured to be rotated in a specific path with respect to the fixing structure 230 fixedly disposed in the hinge housing (e.g., the hinge housing 130 of FIG. 1) when the first housing (e.g., the first housing 110 of FIG. 1) is folded or unfolded. In an embodiment, the second rotation structure 220 may include the second guide part 221 coupled to the fixing structure 230 to be rotated, and a second connection part 222 connected to the second housing 120. The second connection part 222 may be folded or unfolded together with the second housing 120 when the electronic device 100 is folded or unfolded. In an embodiment, the second rotation structure 220 may include the second protrusion 223 that is formed in the second guide part 221. The second protrusion 223 may guide the rotation path of the second rotation structure 220 together with the second guide rail 234.

In an embodiment, the second arm part 250 may include a third coupling part 251, a fourth coupling part 252, and a second extending part 253. In an embodiment, the second arm part 250 may be coupled to the second rotation structure 220 through a second sliding pin 256 to be slid. The second arm part 250 may be coupled to the second arm shaft 250S to be rotated together with the second arm shaft 250S through the third coupling part 251 and the fourth coupling part 252. For example, the third coupling part 251 and the fourth coupling part 252 may be press-fitted with the second arm shaft 250S.

In an embodiment, in relation to sliding of the second arm part 250, the second sliding pin 256 of the second extending part 253 may be coupled to the second rotation structure 220. For example, at least a portion of the second sliding pin 256 may be accommodated in a second sliding groove 225 of the second rotation structure 220. For example, the second sliding pin 256 may be moved along the second sliding groove 225 when the second rotation structure 220 is rotated. In an embodiment, when the second rotation structure 220 is rotated about the second rotation axis R2, the second arm part 250 may be rotated about the second arm shaft 250S, and the second arm part 250 may be slid with respect to the second rotation structure 220 at the same time. For example, the second arm part 250 may be slid while the second sliding pin 256 is coupled to the second rotation structure 220.

In an embodiment, the second arm shaft 250S may be coupled to the fixing structure 230 to be rotated. For example, the second arm shaft 250S may extend long from the fixing structure 230 in the second axial direction ②. The second arm shaft may extend to pass through the first fixing member 236 and the second fixing member 238. For example, rotation of the second arm shaft 250S may be supported by the first fixing member 236 and the second fixing member 238. For example, an end of the second arm shaft 250S in the first axial direction ① may be inserted into a recess or an opening formed in the fixing structure 230 to be rotated. Referring to FIGS. 4 and 5, a second fixing ring 2591 may be coupled to an end of the second arm shaft 250S in the second axial direction ②. The second fixing ring 2591 may be configured to restrict movement of the second arm shaft 250S in the axial direction. The second fixing ring 2591 may be at least partially inserted into a groove formed on an outer peripheral surface of the second arm shaft 250S. For example, the second fixing ring 2591 may include a C-clip that surrounds at least a portion of the second arm shaft 250S. In an embodiment, the second arm shaft 250S may pass through the third coupling part 251 and the fourth coupling part 252 of the second arm part 250. For example, the second arm shaft 250S may be coupled to the third coupling part 251 and the fourth coupling part 252 to be rotated together with the third coupling part 251 and the fourth coupling part 252. For example, the third coupling part 251 and the fourth coupling part 252 may be press-fitted with the second arm shaft 250S.

In this way, when the second rotation structure 220 is rotated, the second arm part 250 may be rotated by the second sliding pin 256. When the second arm part 250 is rotated, the second arm shaft 250S may be rotated by the third coupling part 251 and the fourth coupling part 252.

According to an embodiment, the first rotation structure 210 and the second rotation structure 220 may interlock with each other to be rotated at the same angle in opposite directions, through the first arm shaft 240S, the second arm shaft 250S, and the link structures 260 and 270.

In an embodiment, the hinge structure 200 may include the first torque structure 201 that provides a torque to the first arm shaft 240S, and the second torque structure 202 that provides a torque to the second arm shaft 250S.

In an embodiment, the first torque structure 201 and the second torque structure 202 may provide frictional forces corresponding to a restoring torque of the display 140. For example, in the folded state (e.g., FIGS. 2B and 2C), in which at least a partial area of the display 140 is curved, a restoring force, by which the display 140 is intended to return to the flat state again, may be applied to the display 140. The restoring force may apply a restoring torque to the first arm shaft 240S and the second arm shaft 250S, in the unfolding direction. For example, referring to FIG. 7, the restoring torque may be applied to the first arm shaft 240S in the counterclockwise direction that is the unfolding direction, and may be applied to the second arm shaft 250S in the clockwise direction that is the unfolding direction.

The hinge structure 200 according to an embodiment may be configured to provide a specific frictional torque that offsets the restoring torque such that the display 140 is maintained in a specific folded state. For example, the frictional torque may be proportional to a surface frictional force between the cam structures, and the surface frictional force may be increased by the compressed elastic members 295*a*, 295*b*, 295*c*, and 295*d*. For example, the first torque structure 201 may include first cam structures 244, 245, 291, and 293 that compresses or prolong a third elastic member 295*a* and a fourth elastic member 295*b*. When the third elastic member 295*a* and the fourth elastic member 295*b* are compressed, surface frictional forces between the first cam structures 244, 245, 291, and 293 may increase and the frictional torque may increase. For example, the second torque structure 202 may include second cam structures 254, 255, 292, and 294 that compresses or prolong a fifth elastic member 295*c* and the sixth elastic member 295*d*. When the fifth elastic member 295*c* and the sixth elastic member 295*d* are compressed, surface frictional forces between the second cam structures 254, 255, 292, and 294 may increase and the frictional torque may increase.

In an embodiment, the hinge structure 200 may include a first cam member 290*a* and a second cam member 290*b*. The first arm shaft 240S and the second arm shaft 250S may pass through the first cam member 290*a*. The first cam member 290*a* may be configured to be linearly moved along the first arm shaft 240S and the second arm shaft 250S. The first cam member 290*a* may include a first cam 291 engaged with a first arm cam 244 of the first arm part 240, and a second cam 292 engaged with a third arm cam 254 of the second arm part 250. The first arm shaft 240S and the second arm shaft 250S may pass through the second cam member 290*b*. The second cam member 290*b* may be configured to be linearly moved along the first arm shaft 240S and the second arm shaft 250S. The second cam member 290*b* may include a third cam 293 engaged with a second arm cam 245 of the first arm part 240, and a fourth cam 294 engaged with a fourth arm cam 255 of the second arm part 250.

In an embodiment, the first torque structure 201 may include the first arm cam 244 formed in the first arm part 240, the first cam 291 of the first cam member 290*a*, the third elastic member 295*a*, the fourth elastic member 295*b*, the third cam 293 of the second cam member 290*b*, and the second arm cam 245 of the first arm part 240. Then, the first arm cam 244 and the second arm cam 245 may be configured to be rotated together with the first arm shaft 240S, and the first cam member 290*a* and the second cam member 290*b* may be configured to be linearly in the axial direction. For example, the first arm cam 244 and the second arm cam 245 may be referenced as rotary cams, and the first cam 291 and the third cam 293 may be referenced as linear cams. The third elastic member 295*a* and the fourth elastic member 295*b* may be compressed or prolonged through movements of the first cam member 290*a* and the second cam member 290*b*.

In an embodiment, the third elastic member 295*a* may be disposed in the first arm shaft 240S. The third elastic member 295*a* may be disposed between the first cam 291 of the first cam member 290*a* and the first fixing member 236. The third elastic member 295*a* may be compressed when the first cam member 290*a* is moved in the second axial direction ②, and may be prolonged when the first cam member 290*a* is moved in the first axial direction ①. In an embodiment, the fourth elastic member 295*b* may be disposed in the first arm shaft. The fourth elastic member 295*b* may be disposed between the third cam 293 of the second cam member 290*b* and the first fixing member 236. The fourth elastic member 295*b* may be compressed when the second cam member 290*b* is moved in the first axial direction ①, and may be prolonged when the second cam member 290*b* is moved in the second axial direction ②.

In an embodiment, the second torque structure 202 may include the third arm cam 254 formed in the second arm part 250, the second cam 292 of the first cam member 290*a*, the fifth elastic member 295*c*, the sixth elastic member 295*d*, the fourth cam 294 of the second cam member 290*b*, and the fourth arm cam 255 of the second arm part 250. Then, the third arm cam 254 and the fourth arm cam 255 may be configured to be rotated together with the second arm shaft 250S, and the first cam member 290*a* and the second cam member 290*b* may be configured to be linearly moved in the axial direction. For example, the third arm cam 254 and the fourth arm cam 255 may be referenced as rotary cams, and the second cam 292 and the fourth cam 294 may be referenced as linear cams. The fifth elastic member 295*c* and the sixth elastic member 295*d* may be compressed or prolonged through movements of the first cam member 290*a* and the second cam member 290*b*.

In an embodiment, the fifth elastic member 295*c* may be disposed in the second arm shaft 250S. The fifth elastic member 295*c* may be disposed between the second cam 292 of the first cam member 290*a* and the first fixing member 236. The fifth elastic member 295*c* may be compressed when the first cam member 290*a* is moved in the second axial direction ②, and may be prolonged when the first cam member 290*a* is moved in the first axial direction ①. In an embodiment, the sixth elastic member 295*d* may be disposed in the second arm shaft 250S. The sixth elastic member 295*d* may be disposed between the fourth cam 294 of the second cam member 290*b* and the first fixing member 236. The sixth elastic member 295*d* may be compressed when the second cam member 290*b* is moved in the first axial direction ①, and may be prolonged when the second cam member 290*b* is moved in the second axial direction ②.

In an embodiment, the link structures 260 and 270 may be coupled to the first arm shaft 240S and the second arm shaft 250S, and may be configured to be linearly moved in the axial direction in correspondence to rotations of the first arm shaft 240S and the second arm shaft 250S, respectively. In an embodiment, the link structures 260 and 270 may cause the first arm shaft 240S and the second arm shaft 250S to interlock with each other such that the first rotation structure

210 and the second rotation structure 220 are rotated at the same angle in opposite directions.

In an embodiment, the link structures 260 and 270 may include a first link structure 260 and a second link structure 270. The first link structure 260 and the second link structure 270 may be spaced apart from each other in the axial direction. For example, the first arm part 240, the second arm part 250, the first cam structures 244, 245, 291, and 293, the second cam structures 254, 255, 292, and 294, and the first fixing member 236 may be disposed between the first link structure 260 and the second link structure 270.

In an embodiment, the first link structure 260 may include a first part 260*a*, through which the first arm shaft 240S passes, a second part 260*b*, through which the second arm shaft 250S passes, and a first central part 260*c* connecting the first part 260*a* and the second part 260*b*. For example, the first part 260*a* and the second part 260*b* may extend from the first central part 260*c* in a direction that is substantially perpendicular to the axial direction.

In an embodiment, referring to FIG. 6, a first guide groove 261 may be formed in the first part 260*a*. A first guide pin 248 of the first arm shaft 240S may be accommodated in the first guide groove 261. When the first arm shaft 240S is rotated, the first guide pin 248 may be moved along the first guide groove 261, and thus, the first link structure 260 may be moved to one side in the axial direction.

In an embodiment, the first guide groove 261 may have a spiral shape that surrounds the first arm shaft 240S. The first guide groove 261 may extend in a circumferential direction and an axial direction of the first arm shaft 240S. An axial extension length of the first guide groove 261 may correspond to an axial movement distance of the first link structure 260. A circumferential extension length of the first guide groove 261 may correspond to a rotational angle of the first link structure 260.

In an embodiment, referring to FIG. 6, a second guide groove 262 may be formed in the second part 260*b*. A third guide pin 258 of the second arm shaft 250S may be accommodated in the second guide groove 262. When the second arm shaft 250S is rotated, the third guide pin 258 may be moved along the second guide groove 262, and thus, the second link structure 270 may be moved to one side in the axial direction.

In an embodiment, the second guide groove 262 may have a spiral shape that surrounds the second arm shaft 250S. The second guide groove 262 may extend in a circumferential direction and an axial direction of the second arm shaft 250S. An axial extension length of the second guide groove 262 may correspond to an axial movement distance of the second link structure 270. A circumferential extension length of the second guide groove 262 may correspond to a rotational angle of the second link structure 270.

In an embodiment, the first guide groove 261 and the second guide groove 262 may have shape that are symmetrical to each other with respect to a central axis. The central axis may be defined as an axis that is spaced apart from the first arm shaft 240S and the second arm shaft 250S by the same distance and is parallel to the axial direction. In an embodiment, the first guide groove 261 and the second guide groove 262 may extend in the same axial direction by the same length, and may extend at the same angle in opposite circumferential directions. For example, in the folding operation and the unfolding operation, the first rotation structure 210 and the second rotation structure 220 may be rotated in opposite directions. Accordingly, the first arm shaft 240S and the second arm shaft 250S may be rotated in opposite directions. Accordingly, the first guide groove 261 and the second guide groove 262 may be symmetrical to each other with respect to the central axis such that the first link structure 260 is moved in the same direction when the first arm shaft 240S and the second arm shaft 250S are rotated in opposite directions.

Figure 10:
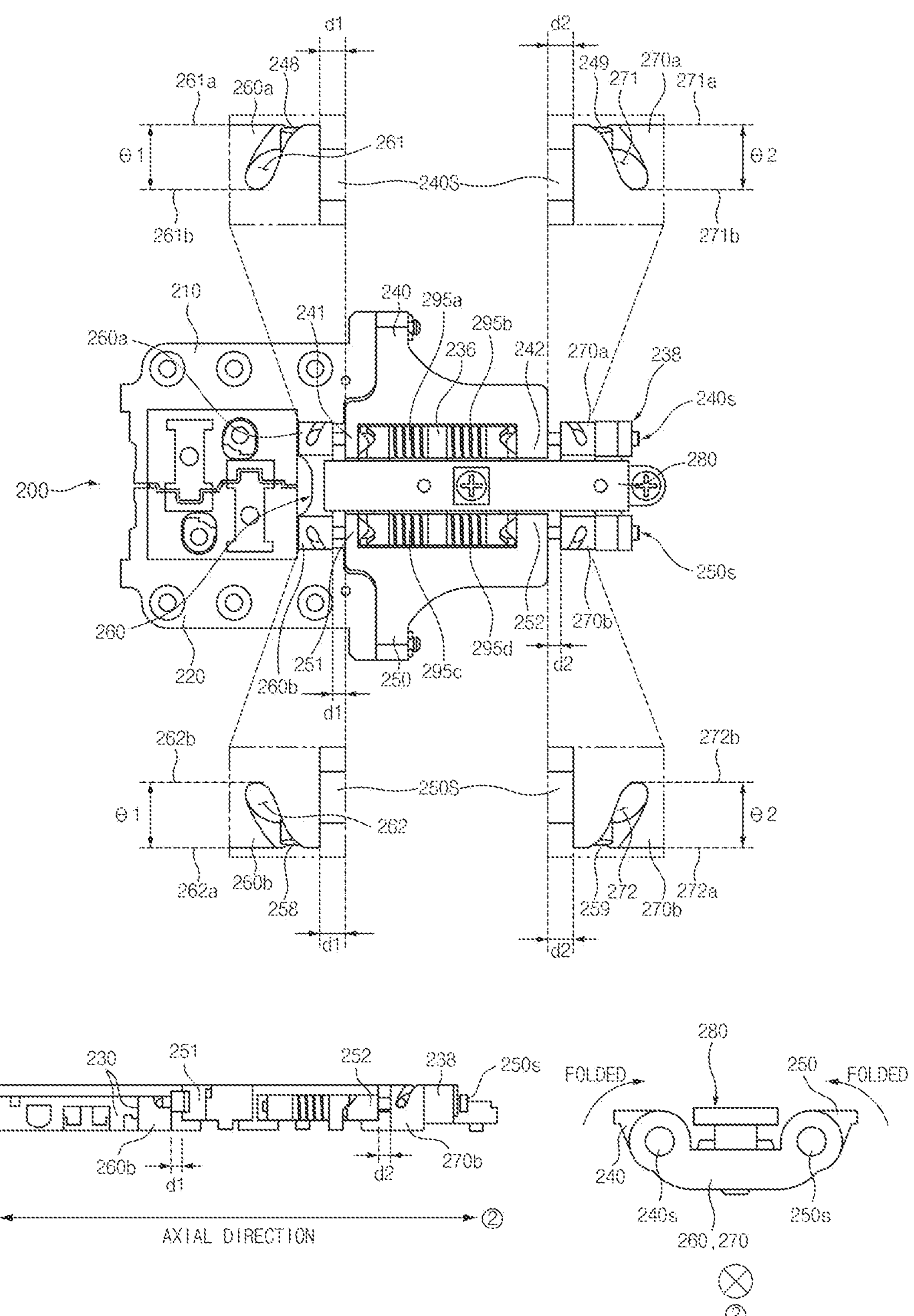
FIG. 10 is a view illustrating a link structure and a center bar of a hinge structure in an unfolded state according to an embodiment of the disclosure.
Figure 11:
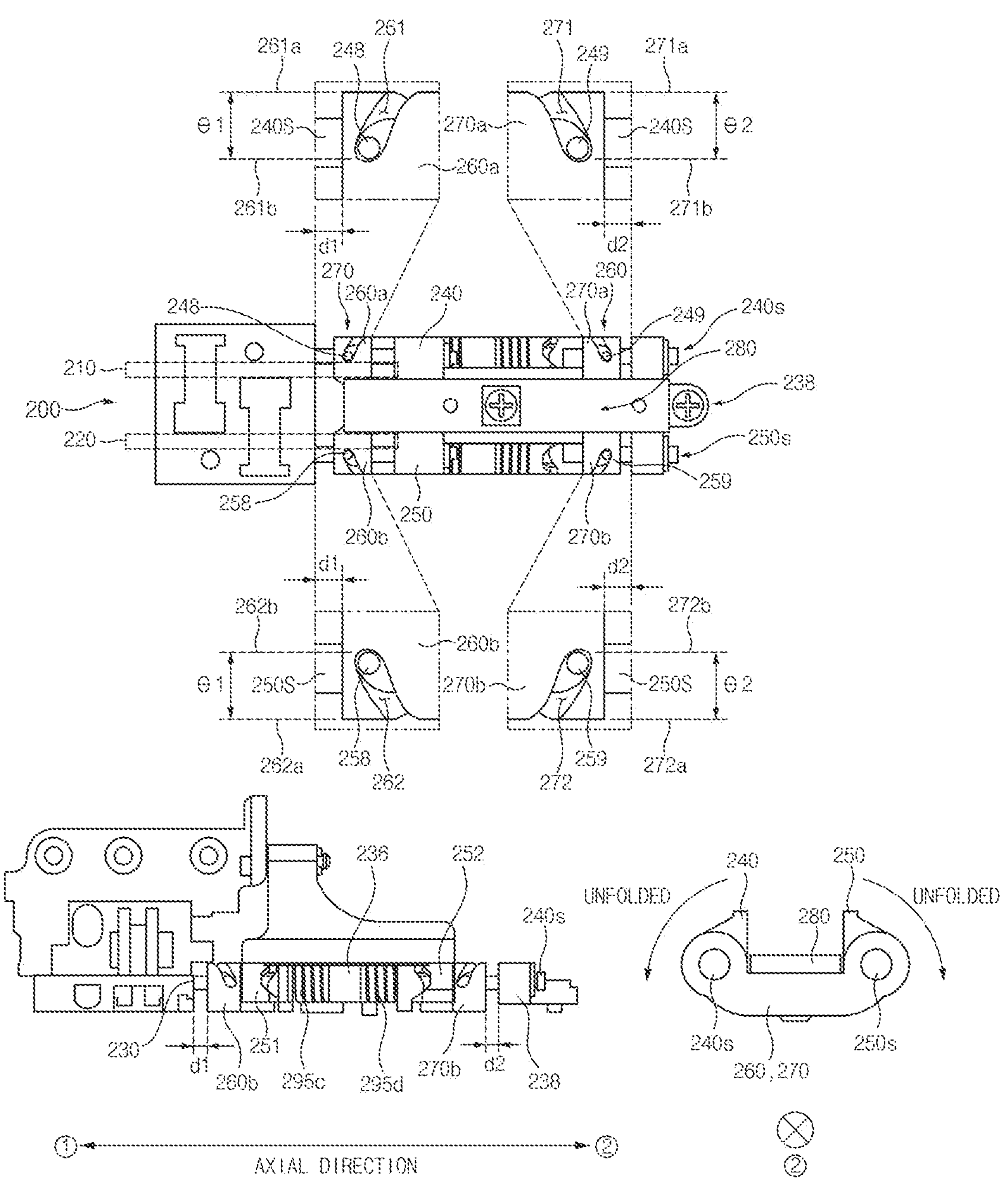
FIG. 11 is a view illustrating a link structure and a center bar of a hinge structure in a fully folded state according to an embodiment of the disclosure.

For example, referring to FIGS. 10 and 11, the first guide groove 261 may extend in the axial direction by a first distance d1, and may extend at a first angle θ1 in the circumferential direction of the first arm shaft 240S. The second guide groove 262 may extend in the axial direction by the first distance d1, and may extend by the first angle θ1 in the circumferential direction of the second arm shaft 250S. In an embodiment, because the first arm shaft 240S and the second arm shaft 250S are rotated in the same angle, the first angle θ1 and a second angle θ2 may be the same. Meanwhile, the first distance d1 and a second distance d2 may be different.

Accordingly, the first link structure 260 may cause the first arm shaft 240S and the second arm shaft 250S to interlock each other such that the first arm shaft 240S and the second arm shaft 250S are rotated in opposite directions but are rotated at the same angle.

In an embodiment, the second link structure 270 may include a third part 270*a*, through which the first arm shaft 240S passes, a fourth part 270*b*, through which the second arm shaft 250S passes, and a second central part 270*c* connecting the third part 270*a* and the fourth part 270*b*. For example, the third part 270*a* and the fourth part 270*b* may extend from the second central part 270*c* in a direction that is substantially perpendicular to the axial direction.

In an embodiment, referring to FIG. 6, a third guide groove 271 may be formed in the third part 270*a*. A second guide pin 249 of the first arm shaft 240S may be accommodated in the third guide groove 271. When the first arm shaft 240S is rotated, the second guide pin 249 may be moved along the third guide groove 271, and thus, the second link structure 270 may be moved to one side in the axial direction.

In an embodiment, the third guide groove 271 may have a spiral shape that surrounds the first arm shaft 240S. The third guide groove 271 may extend in a circumferential direction and an axial direction of the first arm shaft 240S. An axial extension length of the first guide groove 261 may correspond to an axial movement distance of the second link structure 270. A circumferential extension length of the third guide groove 271 may correspond to a rotational angle of the second link structure 270.

In an embodiment, referring to FIG. 6, a fourth guide groove 272 may be formed in the fourth part 270*b*. A fourth guide pin 259 of the second arm shaft 250S may be accommodated in the fourth guide groove 272. When the second arm shaft 250S is rotated, the fourth guide pin 259 may be moved along the fourth guide groove 272, and thus, the second link structure 270 may be moved to one side in the axial direction.

In an embodiment, the fourth guide groove 272 may have a spiral shape that surrounds the second arm shaft 250S. The second guide groove 262 may extend in a circumferential direction and an axial direction of the second arm shaft 250S. An axial extension length of the second guide groove 262 may correspond to an axial movement distance of the second link structure 270. A circumferential extension length of the fourth guide groove 272 may correspond to a rotational angle of the second link structure 270.

In an embodiment, the third guide groove 271 and the fourth guide groove 272 may have a shape that are symmetrical to each other with respect to a central axis. The central axis may be defined as an axis that is spaced apart from the first arm shaft 240S and the second arm shaft 250S by the same distance and is parallel to the axial direction. In an embodiment, the third guide groove 271 and the fourth guide groove 272 may extend in the same axial direction by the same length, and may extend at the same angle in opposite circumferential directions. For example, in the folding operation and the unfolding operation, the first rotation structure 210 and the second rotation structure 220 may be rotated in opposite directions. Accordingly, the first arm shaft 240S and the second arm shaft 250S may be rotated in opposite directions. Accordingly, the third guide groove 271 and the fourth guide groove 272 may be symmetrical to each other with respect to the central axis such that the second link structure 270 is moved in the same direction when the first arm shaft 240S and the second arm shaft 250S are rotated in opposite directions.

For example, referring to FIGS. 10 and 11, the third guide groove 271 may extend in the axial direction by a second distance d2, and may extend at a second angle θ2 in the circumferential direction of the first arm shaft 240S. The fourth guide groove 272 may extend in the axial direction by the second distance d2, and may extend by the second angle θ2 in the circumferential direction of the second arm shaft 250S. In an embodiment, because the first arm shaft 240S and the second arm shaft 250S are rotated in the same angle, the first angle θ1 and the second angle θ2 may be the same. Meanwhile, the first distance d1 and the second distance d2 may be different.

Accordingly, the second link structure 270 may cause the first arm shaft 240S and the second arm shaft 250S to interlock each other such that the first arm shaft 240S and the second arm shaft 250S are rotated in opposite directions but are rotated at the same angle.

In an embodiment, the center bar 280 may be configured to support a rear surface of the display 140 such that the folding area (e.g., the folding area 143 of FIG. 2A) of the display (e.g., the display 140 of FIG. 2A) is maintained on a plane in the unfolded state. In various embodiments, the center bar 280 may be configured to support the folding area 143 of the display 140, which is at least partially curved in the folded state. To achieve this, the center bar 280 may be configured to be moved in the z/−z axis direction in the folding operation and the unfolding operation. In an embodiment, the center bar 280 may interlock with movements of the first link structure 260 and the second link structure 270.

In an embodiment, the center bar 280 may be coupled to the first fixing member 236, the second fixing member 238, the first link structure 260, and the second link structure 270. Referring to FIG. 4, the center bar 280 may at least partially overlap the first central part 260*c* of the first link structure 260, the second central part 270*c* of the second link structure 270, the first fixing member 236, and the second fixing member 238, when the hinge structure 200 is viewed from a top. In an embodiment, the center bar 280 may extend long in the axial direction.

Referring to FIG. 7, the center bar 280 may include the first protruding part 283, the second protruding part 284, a first inclined protrusion 281, and a second inclined protrusion 282, which are formed on a rear surface of the center bar 280.

In an embodiment, a first elastic member 288 may be disposed in the first protruding part 283. For example, the first elastic member 288 may surround at least a portion of the first protruding part 283.

In an embodiment, referring to FIG. 5, the first screw 283*a* may be coupled to the first protruding part 283. Referring to FIG. 7, the first protruding part 283 may be at least partially inserted into the first hole 2361 of the first fixing member 236. Then, at least a portion of the first screw 283*a* may be located in an interior of the first hole 2361. A head of the first screw 283*a* may support one side of the first elastic member 288. For example, the head of the first screw 283*a* may be referenced as a flange.

In an embodiment, a second elastic member 289 may be disposed in the second protruding part 284. For example, the second elastic member 289 may surround at least a portion of the second protruding part 284.

In an embodiment, referring to FIG. 5, the second screw 284*a* may be coupled to the second protruding part 284. Referring to FIG. 7, the second protruding part 284 may be at least partially inserted into the second hole 2381 of the second fixing member 238. Then, at least a portion of the second screw 284*a* may be located in an interior of the second hole 2381. A head of the second screw 284*a* may support one side of the second elastic member 289. For example, the head of the second screw 284*a* may be referenced as a flange.

In an embodiment, the first protruding part 283 and the second protruding part 284 may extend long as compared with a z axis displacement, by which the center bar 280 may be moved. Accordingly, the center bar 280 may be moved in the z axis direction while the first protruding part 283 and the second protruding part 284 are accommodated in the first hole 2361 and the second hole 2381, respectively. That is, the first protruding part 283 and the second protruding part 284 may guide movement of the center bar 280.

In an embodiment, the first elastic member 288 may be at least partially located in an interior of the first hole 2361 of the first fixing member 236. The first elastic member 288 may provide an elastic force to the center bar 280. The first elastic member 288, for example, may be configured to be compressed as the center bar 280 is moved in the z axis direction and be prolonged as the center bar 280 is moved in the −z axis direction.

In an embodiment, the second elastic member 289 may be at least partially located in an interior of the second hole 2381 of the second fixing member 238. The second elastic member 289 may provide an elastic force to the center bar 280. The second elastic member 289, for example, may be configured to be compressed as the center bar 280 is moved in the z axis direction and be prolonged as the center bar 280 is moved in the −z axis direction.

In an embodiment, referring to FIG. 7, the first inclined protrusion 281 may include a third inclined surface 281*a*. The third inclined surface 281*a* may at least partially contact a first inclined surface 264 formed in the first central part 260*c* of the first link structure 260. When the first link structure 260 is moved in the axial direction, the third inclined surface 281*a* may be pressed in the z axis direction by the first inclined surface 264.

In an embodiment, referring to FIG. 7, the second inclined protrusion 282 may include a fourth inclined surface 282*a*. The fourth inclined surface 282*a* may at least partially contact a second inclined surface 274 formed in the second central part 270*c* of the second link structure 270. When the second link structure 270 is moved in the axial direction, the fourth inclined surface 282*a* may be pressed in the z axis direction by the second inclined surface 274.

In an embodiment, the center bar 280 may be configured to be moved in the z axis direction and the −z axis direction through movements of the first link structure 260 and the second link structure 270, and may be additionally moved by elastic forces of the first elastic member 288 and the second elastic member 289.

Figure 8A:
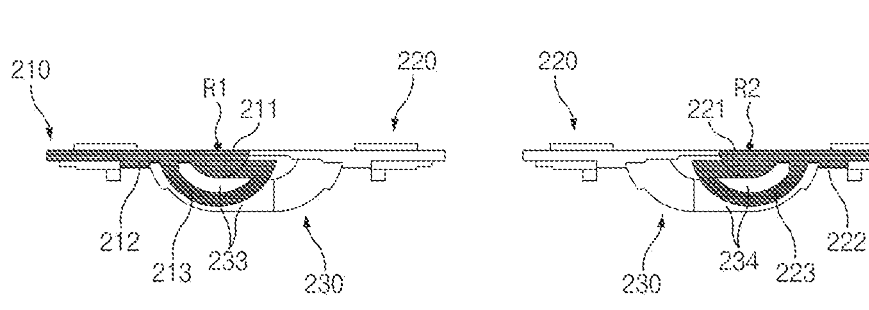
FIGS. 8A, 8B, and 8C are views illustrating a rotation operation of a hinge structure according to various embodiments of the disclosure.
Figure 8B:
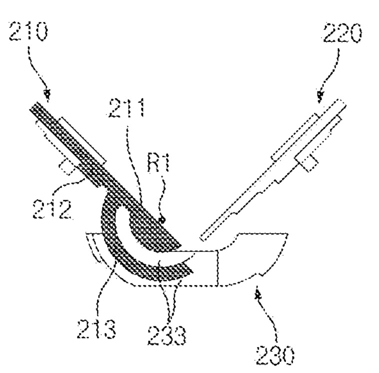
Figure 8B:
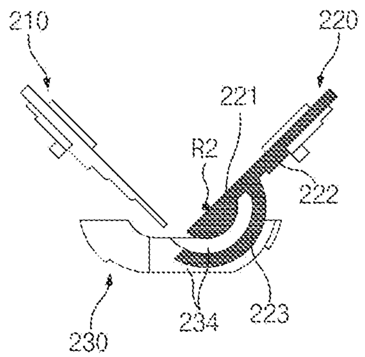
Figure 8C:
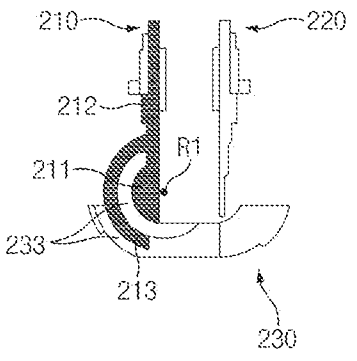
Figure 8C:
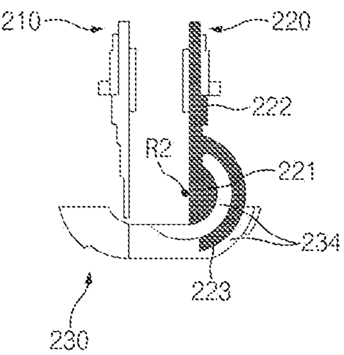

FIGS. 8A, 8B, and 8C are views illustrating a rotation operation of the hinge structure according to various embodiments of the disclosure. FIGS. 8A to 8C are views of the hinge structure, when viewed in direction "A" illustrated in FIG. 3.

FIG. 8A is a view illustrating a hinge structure in the unfolded state. FIG. 8B is a view illustrating a hinge structure in the folded state. FIG. 8C is a view illustrating a hinge structure in the fully folded state.

Referring to FIGS. 8A to 8C, in an embodiment, the first guide rail 233 and the second guide rail 234 may be formed in the fixing structure 230. In an embodiment, the first guide rail 233 may have a substantially arc-shape. For example, a center of the arc of the first guide rail 233 may be the first rotation axis R1. That is, the first guide rail 233 may guide the first rotation structure 210 such that the first rotation structure 210 is rotated along a rotation path, a center of which is the first rotation axis R1. In an embodiment, the second guide rail 234 may have a substantially arc-shape. For example, a center of the arc of the second guide rail 234 may be the second rotation axis R2. That is, the second guide rail 234 may guide the second rotation structure 220 such that the second rotation structure 220 is rotated along a rotation path, a center of which is the second rotation axis R2.

In an embodiment, the first rotation structure 210 may include the first connection part 212 and the first guide part 211. The first guide part 211 may have a substantially cylindrical shape. For example, a cross-section of the first guide part 211 may have a substantially arc shape. In an embodiment, the first rotation structure 210 may be rotated about the first rotation axis R1 while the first protrusion 213 of the first guide part 211 is accommodated in the first guide rail 233 of the fixing structure 230. For example, when the first connection part 212 is folded or unfolded together with the first housing 110, the first rotation structure 210 may be rotated along a rotation path having an arc shape, a center of which is the first rotation axis R1.

In an embodiment, the second rotation structure 220 may include the second connection part 222 and the second guide part 221. The second guide part 221 may have a substantially cylindrical shape. For example, a cross-section of the second guide part 221 may have a substantially arc shape. In an embodiment, the second rotation structure 220 may be rotated about the second rotation axis R2 while the second protrusion 223 is accommodated in the second guide rail 234. For example, when the second connection part 222 is folded or unfolded together with the second housing 120, the second rotation structure 220 may be rotated along a rotation path having an arc shape, a center of which is the second rotation axis R2.

In an embodiment, the first rotation axis R1 and the second rotation axis R2 may be parallel to the axial direction of the hinge structure 200. In an embodiment, the first rotation axis R1 and the second rotation axis R2 may be formed at locations that are spaced apart from the first connection part 212 of the first rotation structure 210 and the second connection part 222 of the second rotation structure 220 in the z axis direction.

Referring to FIG. 8A, the first connection part 212 may restrict a direction, in which the first rotation structure 210 may be rotated, to one in the unfolded state. For example, a first end of the first guide rail 233 may be opened and another second end thereof may be covered by the first connection part 212. Accordingly, the first rotation structure 210 may be rotated about the first rotation axis R1 in the clockwise direction with reference to the drawings in the unfolded state and cannot be rotated in the counterclockwise direction.

Referring to FIG. 8A, the second connection part 222 may restrict a direction, in which the second rotation structure 220 may be rotated, to one in the unfolded state. For example, a third end of the second guide rail 234 may be opened and another fourth end thereof may be covered by the second connection part 222. Accordingly, the second rotation structure 220 may be rotated about the second rotation axis R2 in the counterclockwise direction with reference to the drawings in the unfolded state and cannot be rotated in the clockwise direction.

Figure 9A:
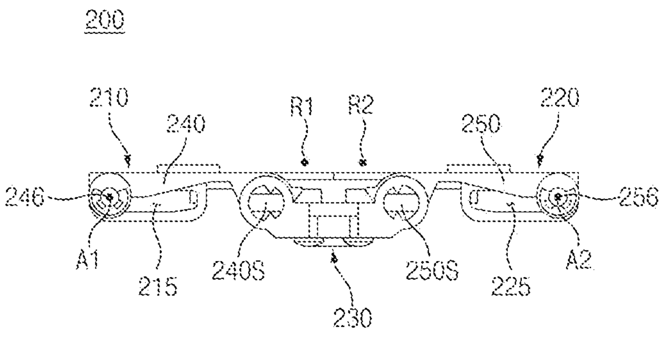
FIGS. 9A, 9B, and 9C are views illustrating rotation operations and sliding operations of an arm part and a rotation structure of a hinge structure according to various embodiments of the disclosure.
Figure 9B:
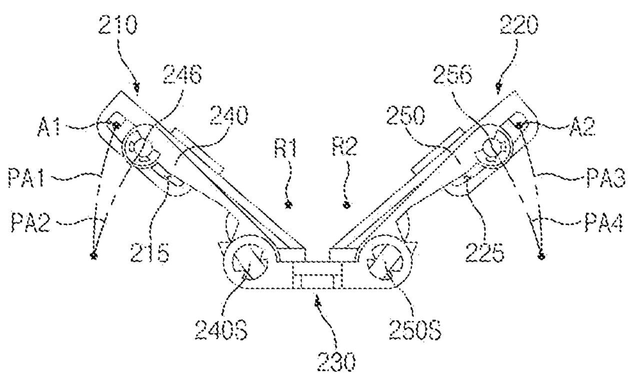
Figure 9C:
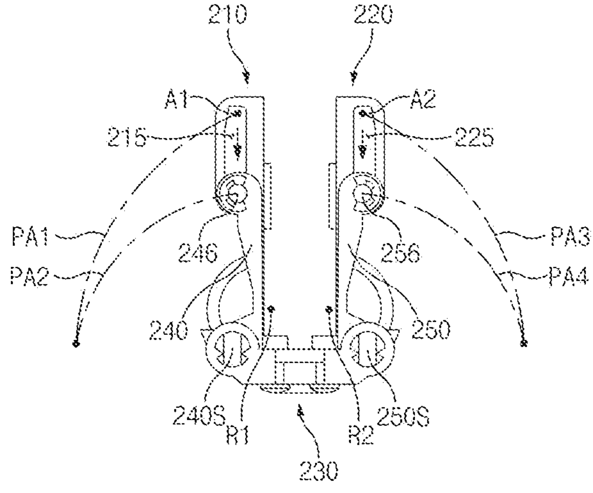

FIGS. 9A, 9B, and 9C are views illustrating rotation operations and sliding operations of the arm part and the rotation structure of the hinge structure according to various embodiments of the disclosure. FIGS. 9A to 9C views illustrating the hinge structure, when viewed in direction "B" illustrated in FIG. 3.

FIG. 9A is a view illustrating a hinge structure in the unfolded state. FIG. 9B is a view illustrating a hinge structure in the folded state. FIG. 9C is a view illustrating a hinge structure in the fully folded state.

Referring to FIGS. 9A to 9C, when the hinge structure 200 is folded or unfolded, the rotation structures 210 and 220 and the arm parts 240 and 250 may be rotated about different axes. For example, the rotation structures 210 and 220 and the arm parts 240 and 250 may be rotated in different rotation paths. Due to the difference of the rotation paths of the rotation structures 210 and 220 and the arm parts 240 and 250, the arm parts 240 and 250 may be slid when the hinge structure 200 is folded or unfolded.

In an embodiment, the first rotation structure 210 may be rotated about the first rotation axis R1 in the first rotation direction. For example, in the folding operation, the first rotation structure 210 may be rotated in the clockwise direction. For example, with reference to the unfolded state, a point of the first rotation structure 210, at which the first sliding pin 246 is located, may be defined as a first point A1. In the folding and unfolding operations, the first point A1 of the first rotation structure 210 may be moved along a first rotation path PA1.

Referring to FIGS. 9A to 9C, the first arm part 240 and the first sliding pin 246 may be rotated about the first arm shaft 240S. For example, in the folding operation, the first arm part 240 and the first sliding pin 246 may be rotated in the clockwise direction. For example, in the unfolded state, the first sliding pin 246 may be located at the first point A1, and in the folded state, the first sliding pin 246 may be located at a location that is spaced apart from the first point A1 in a direction that is perpendicular to the axial direction. The first sliding pin 246 may be moved along a second rotation path PA2 in the folding and unfolding operations.

In various embodiments, the first rotation path PA1 and the second rotation path PA2 may be different. For example, the first rotation axis R1 and the first arm shaft 240S may be parallel to each other but do not coincide with each other, and the rotation radii of the first rotation structure 210 and the first arm part 240 may not coincide with each other.

Accordingly, in the folding and unfolding operations, the first arm part 240 and the first sliding pin 246 may be slid with respect to the first rotation structure 210. The sliding operations of the first sliding pin 246 and the first arm part 240 may be guided as the first sliding pin 246 is accommodated in the first sliding groove 215 of the first rotation structure 210. In an embodiment, when the folding operation is performed from the unfolded state, a distance between the first sliding pin 246 and the first point A1 may increase. When the unfolding operation is performed from the fully folded state, the distance between the first sliding pin 246 and the first point A1 may decrease.

In an embodiment, the second rotation structure 220 may be rotated about the second rotation axis R2 in the second rotation direction. For example, in the folding operation, the second rotation structure 220 may be rotated in the counterclockwise direction. For example, with reference to the unfolded state, a point of the second rotation structure 220, at which the second sliding pin 256 is located, may be defined as a second point A2. In the folding and unfolding operations, the second point A2 may be moved along a third rotation path PA3.

In an embodiment, the second arm part 250 and the second sliding pin 256 may be rotated about the second arm shaft 250S. For example, in the folding operation, the second arm part 250 and the second sliding pin 256 may be rotated in the counterclockwise direction. For example, in the unfolded state, the second sliding pin 256 may be located at the second point A2, and in the folded state, the second sliding pin 256 may be located at a location that is spaced apart from the second point A2 in a direction that is perpendicular to the axial direction. The second sliding pin 256 may be moved along a fourth rotation path PA4 in the folding and unfolding operations.

In various embodiments, the third rotation path PA3 and the fourth rotation path PA4 may be different. For example, the second rotation axis R2 and the second arm shaft 250S may be parallel to each other but do not coincide with each other, and the rotation radii of the second rotation structure 220 and the second arm part 250 may not coincide with each other.

Accordingly, in the folding and unfolding operations, the second arm part 250 and the second sliding pin 256 may be slid with respect to the second rotation structure 220. The sliding operations of the second sliding pin 256 and the second arm part 250 may be guided as the second sliding pin 256 is accommodated in the second sliding groove 225 of the second rotation structure 220. In an embodiment, when the folding operation is performed from the unfolded state, a distance between the second sliding pin 256 and the second point A2 may increase. When the unfolding operation is performed from the fully folded state, the distance between the second sliding pin 256 and the second point A2 may decrease.

FIG. 10 is a view illustrating the link structure and the center bar of the hinge structure in the unfolded state according to an embodiment of the disclosure. FIG. 11 is a view illustrating the link structure and the center bar of the hinge structure in the fully folded state according to an embodiment of the disclosure.

Referring to FIGS. 10 and 11, in an embodiment, when the electronic device 100 and/or the hinge structure 200 performs the folding operation and the unfolding operation, the link structures 260 and 270 may be configured to be moved in the axial direction. The first link structure 260 and the second link structure 270 may be disposed at locations that are spaced apart from each other in the axial direction. The first link structure 260 may be located at a location that is spaced apart from the second link structure 270 in the first axial direction ①. The second link structure 270 may be located at a location that is spaced apart from the first link structure 260 in the second axial direction ②.

In an embodiment, the first coupling part 241 and the second coupling part 242 of the first arm part 240, the third coupling part 251 and the fourth coupling part 252 of the second arm part 250, the first fixing member 236, the first cam member 290*a*, the second cam member 290*b*, and the elastic members 295*a*, 295*b*, 295*c*, and 295*d* may be disposed between the first link structure 260 and the second link structure 270.

In an embodiment, the first link structure 260 may be configured such that the first part 260*a* is coupled to the first arm shaft 240S and the second part 260*b* is coupled to the second arm shaft 250S. For example, the first link structure 260 may be moved in the axial direction along the first arm shaft 240S and the second arm shaft. The first guide pin 248 of the first arm shaft 240S may be located in the first guide groove 261 formed in the first part 260*a*. The third guide pin 258 of the second arm shaft 250S may be located in the second guide groove 262 formed in the second part 260*b*.

In an embodiment, the first link structure 260 may be disposed between the fixing structure 230 and the arm parts 240 and 250. For example, the first part 260*a* of the first link structure 260 may be disposed between the fixing structure 230 and the first coupling part 241 of the first arm part 240, and the second part 260*b* may be disposed between the fixing structure 230 and the third coupling part 251 of the second arm part 250.

In an embodiment, the first link structure 260 may be disposed to be spaced apart from the fixing structure 230 and/or the arm parts 240 and 250 in the axial direction. For example, referring to FIG. 10 corresponding to the unfolded state, the first link structure 260 may at least partially contact the fixing structure 230, and may be spaced apart from the first coupling part 241 of the first arm part 240 and the third coupling part 251 of the second arm part 250 by a first distance d1. The first distance d1 may be substantially the same as or larger than the axial movement displacement of the first link structure 260. For example, referring to FIG. 11 corresponding to the fully folded state, the first link structure 260 may at least partially contact the first coupling part 241 of the first arm part 240 and the third coupling part 251 of the second arm part 250, and may be spaced apart from the fixing structure 230 by the first distance d1. The first distance d1 may be substantially the same as or larger than the axial movement displacement of the first link structure 260. For example, the fixing structure 230 and the arm parts 240 and 250 may perform a stopper function of restricting a maximum movement distance of the first link structure 260.

In an embodiment, in the unfolded state of FIG. 10, the first guide pin 248 may be located at a first end 261*a* of the first guide groove 261, and the third guide pin 258 may be located at a first end 262*a* of the second guide groove 262. In various embodiments, the unfolded state may include a state, in which the first part 260*a* and the second part 260*b* of the first link structure 260 at least partially contact the fixing structure 230.

In an embodiment, in the fully folded state of FIG. 11, the first guide pin 248 may be located at a second end 261*b* of the first guide groove 261, and the third guide pin 258 may be located at a second end 262*b* of the second guide groove 262. In various embodiments, the fully folded state may include a state, in which the first part 260*a* of the first link structure 260 at least partially contacts the first coupling part 241 of the first arm part 240 and the second part 260*b* of the first link structure 260 at least partially contacts the third coupling part 251 of the second arm part 250.

In an embodiment, distances between the first ends 261*a* and 262*a* and the second ends 261*b* and 262*b* of the first guide groove 261 and the second guide groove 262, which are measured in the axial direction, may be substantially the same as the first distance d1.

In an embodiment, the second link structure 270 may be configured such that the third part 270*a* is coupled to the first arm shaft 240S and the fourth part 270*b* is coupled to the second arm shaft 250S. For example, the second link structure 270 may be moved in the axial direction along the first arm shaft 240S and the second arm shaft 250S. The second guide pin 249 of the first arm shaft 240S may be located in the third guide groove 271 formed in the third part 270*a*. The fourth guide pin 259 of the second arm shaft 250S may be located in the fourth guide groove 272 formed in the fourth part 270*b*.

In an embodiment, the second link structure 270 may be disposed between the second fixing member 238 and the arm parts 240 and 250. For example, the third part 270*a* of the second link structure 270 may be disposed between the second fixing member 238 and the second coupling part 242 of the first arm part 240, and the fourth part 270*b* may be disposed between the second fixing member 238 and the fourth coupling part 252 of the second arm part 250.

In an embodiment, the second link structure 270 may be disposed to be spaced apart from the second fixing member 238 and/or the arm parts 240 and 250 in the axial direction. For example, referring to FIG. 10 corresponding to the unfolded state, the second link structure 270 may at least partially contact the second fixing member 238, and may be spaced apart from the second coupling part 242 of the first arm part 240 and the fourth coupling part 252 of the second arm part 250 by a second distance d2. The second distance d2 may be substantially the same as or larger than the axial movement displacement of the second link structure 270. For example, referring to FIG. 11 corresponding to the fully folded state, the second link structure 270 may at least partially contact the second coupling part 242 of the first arm part 240 and the fourth coupling part 252 of the second arm part 250, and may be spaced apart from the second fixing member 238 by the second distance d2. The second distance d2 may be substantially the same as or larger than the axial movement displacement of the second link structure 270. For example, the second fixing member 238 and the arm parts 240 and 250 may perform a stopper function of restricting a maximum movement distance of the second link structure 270.

In an embodiment, in the unfolded state of FIG. 10, the second guide pin 249 may be located at a first end 271*a* of the third guide groove 271, and the fourth guide pin 259 may be located at a first end 272*a* of the fourth guide groove 272. In various embodiments, the unfolded state may include a state, in which the third part 270*a* and the fourth part 270*b* of the second link structure 270 at least partially contact the second fixing member 238.

In an embodiment, in the fully folded state of FIG. 11, the second guide pin 249 may be located at a second end 271*b* of the third guide groove 271, and the fourth guide pin 259 may be located at a second end 272*b* of the fourth guide groove 272. In various embodiments, the fully folded state may include a state, in which the third part 270*a* of the second link structure 270 at least partially contacts the second coupling part 242 of the first arm part 240 and the fourth part 270*b* of the second link structure 270 at least partially contacts the fourth coupling part 252 of the second arm part 250.

In an embodiment, distances between the first ends 271*a* and 272*a* and the second ends 271*b* and 272*b* of the third guide groove 271 and the fourth guide groove 272, which are measured in the axial direction, may be substantially the same as the second distance d2.

In various embodiments, the first distance d1 and the second distance d2 may be the same. For example, a displacement of the first link structure 260 and a displacement of the second link structure 270 may be the same. However, the displacement (e.g., the first distance d1) of the first link structure 260 and the displacement (e.g., the second distance d2) of the second link structure 270 are not limited to being necessarily the same. For example, the second link structure 270 may be configured to have a displacement that is larger than that of the first link structure 260 in the axial direction. Then, the third guide groove 271 and the fourth guide groove 272 of the second link structure 270 may extend longer in the axial direction, and the second fixing member 238 and the arm parts 240 and 250 may be disposed to have a larger distance in consideration of the increased displacements.

Referring to the folding operation of the hinge structure 200 being changed from the unfolded state illustrated in FIG. 10 to the folded state illustrated in FIG. 11, the first rotation structure 210, the first arm part 240, and the first arm shaft 240S may be rotated in the clockwise direction when viewed in the second axial direction ②. The first guide pin 248 and the second guide pin 249 provided to the first arm shaft 240S may be rotated in the clockwise direction. The second rotation structure 220, the second arm part 250, and the second arm shaft 250S may be rotated in the counterclockwise direction when viewed in the second axial direction ②. The third guide pin 258 and the fourth guide pin 259 provided to the second arm shaft 250S may be rotated in the counterclockwise direction. The first link structure 260 may be configured to be moved in the second axial direction ②, and the second link structure 270 may be configured to be moved in the first axial direction ①. In an embodiment, the center bar 280 may be moved in the −z axis direction in the folding operation. For example, the center bar 280 may be moved in the −z axis direction while the second protruding part 284 of the center bar 280 is accommodated in the second hole 2381 of the second fixing member 238.

Referring to the unfolding operation of the hinge structure 200 being changed from the folded state illustrated in FIG. 11 to the unfolded state illustrated in FIG. 10, the first rotation structure 210, the first arm part 240, and the first arm shaft 240S may be rotated in the counterclockwise direction when viewed in the second axial direction ②. The first guide pin 248 and the second guide pin 249 provided to the first arm shaft 240S may be rotated in the counterclockwise direction. The second rotation structure 220, the second arm part 250, and the second arm shaft 250S may be rotated in the clockwise direction when viewed in the second axial direction ②. The third guide pin 258 and the fourth guide pin 259 provided to the second arm shaft 250S may be rotated in the clockwise direction. The first link structure 260 may be configured to be moved in the first axial direction ①, and the second link structure 270 may be configured to be moved in the second axial direction ②. In an embodiment, the center bar 280 may be moved in the z axis direction in the folding operation. For example, the center bar 280 may be moved in the z axis direction while the second protruding part 284 of the center bar 280 is accommodated in the second hole 2381 of the second fixing member 238.

In an embodiment, movement directions of the first link structure 260 and the second link structure 270 may be related to extension directions of the guide grooves 261, 262, 271, and 272. For example, the second ends 261*b* and

262*b* of the first guide groove 261 and the second guide groove 262 of the first link structure 260 may be located in the first axial direction ① of the first ends 261*a* and 262*a*, and thus, the first link structure 260 may be moved in the second axial direction ② in the folding operation. For example, the second ends 271*b* and 272*b* of the third guide groove 271 and the fourth guide groove 272 of the second link structure 270 may be located in the second axial direction ② of the first ends 271*a* and 272*a*, and thus, the second link structure 270 may be moved in the first axial direction ① in the folding operation.

FIGS. 10 and 11 illustrate that the first link structure 260 and the second link structure 270 are moved in opposite directions, but the hinge structure 200 according to embodiments disclosed in the disclosure is not limited to being necessarily moved in opposite directions. In various embodiments, the first link structure 260 and the second link structure 270 may be configured to be moved in the same direction. In the embodiment, the guide grooves 261 and 262 of the first link structure 260 and the guide grooves 271 and 272 of the second link structure 270 may extend in the same direction.

Figure 12:
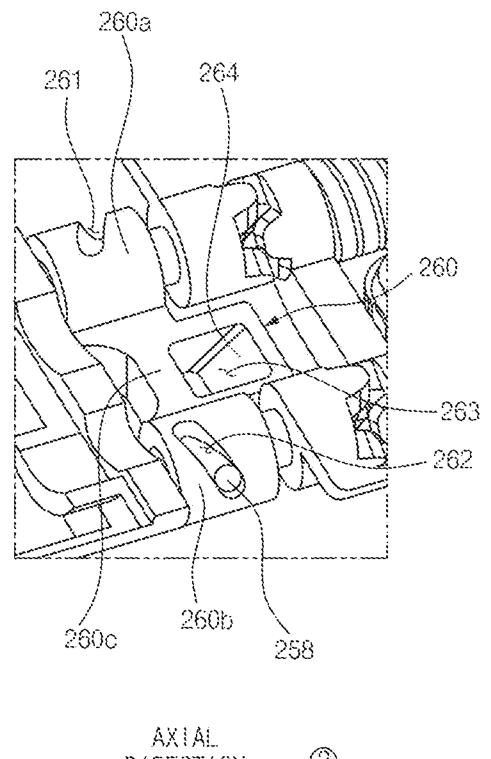
FIG. 12 is a view illustrating a link structure of a hinge structure in an unfolded state according to an embodiment of the disclosure.
Figure 12:
Figure 12:
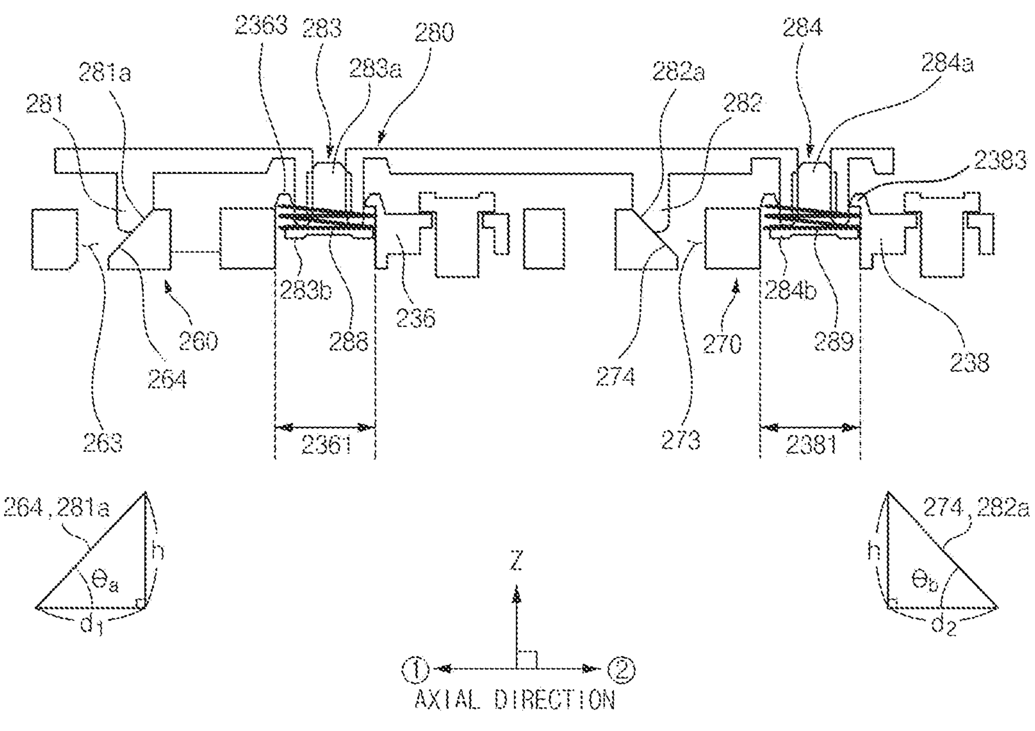
Figure 13:
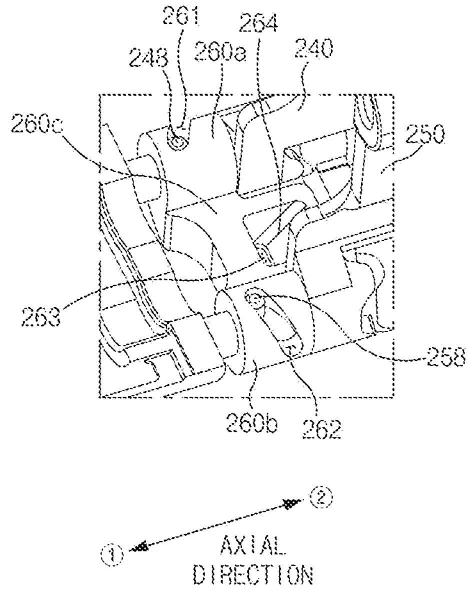
FIG. 13 is a view illustrating a link structure of a hinge structure in a fully folded state according to an embodiment of the disclosure.
Figure 13:
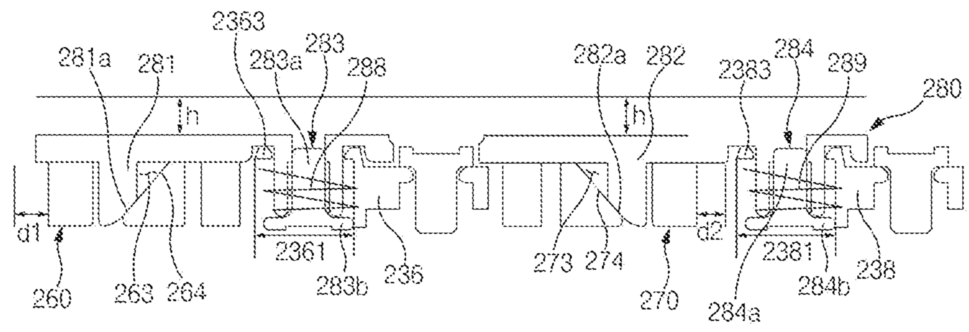
Figure 13:
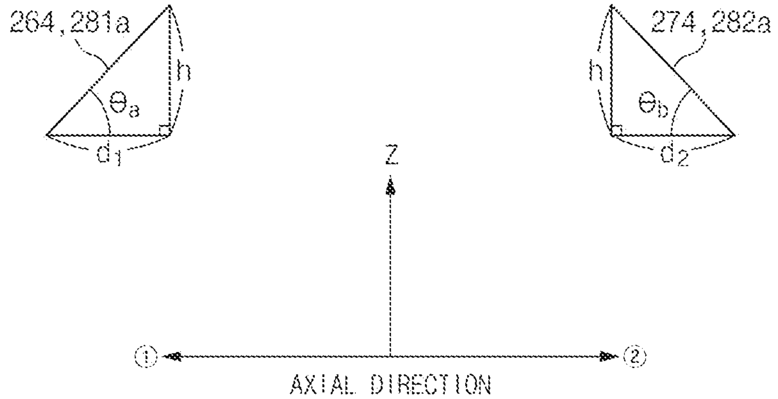

FIG. 12 is a view illustrating the link structure of the hinge structure in the unfolded state according to an embodiment of the disclosure. FIG. 13 is a view illustrating the link structure of the hinge structure in the fully folded state according to an embodiment of the disclosure.

Referring to FIGS. 12 and 13, in an embodiment, a first opening 263 may be formed in the first central part 260*c* of the first link structure 260. A portion of a side wall of the first opening 263 may include the first inclined surface 264. The first inclined surface 264 may at least partially contact the third inclined surface 281*a* of the first inclined protrusion 281. In an embodiment, the first inclined surface 264 may be formed to be inclined in the −z axis direction as it goes in the first axial direction ①.

In an embodiment, a second opening 273 may be formed in the second central part 270*c* of the second link structure 270. A portion of a side wall of the second opening 273 may include the second inclined surface 274. The second inclined surface 274 may at least partially contact the fourth inclined surface 282*a* of the second inclined protrusion 282. In an embodiment, the second inclined surface 274 may be formed to be inclined in the z axis direction as it goes in the first axial direction ①.

At least portions of the first protruding part 283 and the first elastic member 288 may be disposed in an interior of the first hole 2361 of the first fixing member 236. A first stepped portion 2363 that faces a first flange 283*b* of the first protruding part 283 or the head of the first screw 283*a* in the z axis direction may be formed on an inner surface of the first hole 2361. The first stepped portion 2363 may support the first elastic member 288.

In an embodiment, at least portions of the second protruding part 284 and the second elastic member 289 may be disposed in an interior of the second hole 2381 of the second fixing member 238. A second stepped portion 2383 that faces a second flange 284*b* of the second protruding part 284 or the head of the second screw 284*a* in the z axis direction may be formed on an inner surface of the second hole 2381. The second stepped portion 2383 may support the second elastic member 289.

In an embodiment, the center bar 280 may be coupled to the first link structure 260, the second link structure 270, the first fixing member 236, and the second fixing member 238 to be moved in the z axis direction. In an embodiment, the center bar 280 may include the first inclined protrusion 281, the second inclined protrusion 282, the first protruding part 283, and the second protruding part 284, which protrude in the −z axis direction.

In an embodiment, the center bar 280 may be disposed such that the first inclined protrusion 281 is at least partially accommodated in the first opening 263 of the first link structure 260, the second inclined protrusion 282 is at least partially accommodated in the second opening 273 of the second link structure 270, the first protruding part 283 is at least partially accommodated in the first hole 2361 of the first fixing member 236, and the second protruding part 284 is at least partially accommodated in the second hole 2381 of the second fixing member 238.

In an embodiment, the first protruding part 283 may include the first flange 283*b* formed at the −z axis end thereof. The first flange 283*b* may support one side of the first elastic member 288. According to various embodiments, the first protruding part 283 may include a first protruding boss and the first screw 283*a* coupled to the first protruding boss. The head of the first screw 283*a* may define the first flange 283*b*. However, the first protruding part 283 is not limited to being formed through coupling of the first protruding boss and the first screw 283*a*, and the first protruding part 283 may include various stepped structures or flange structures that may support the first elastic member 288.

In an embodiment, the second protruding part 284 may include the second flange 284*b* formed at the −z axis end thereof. The second flange 284*b* may support one side of the second elastic member 289. According to various embodiments, the second protruding part 284 may include a second protruding boss and the second screw 284*a* coupled to the second protruding boss. The head of the second screw 284*a* may define the flange. However, the second protruding part 284 is not limited to being formed through coupling of the second protruding boss and the second screw 284*a*, and the second protruding part 284 may include various stepped structures or flange structures that may support the second elastic member 289.

In an embodiment, the first elastic member 288 may be disposed to surround at least a portion of the first protruding part 283. One side of the first elastic member 288 may be supported by the first flange 283*b* of the first protruding part 283 or the head of the first screw 283*a*, and an opposite side thereof may be supported by the first stepped portion 2363 of the first hole 2361 of the first fixing member 236. For example, the first stepped portion 2363 may face the first flange 283*b* of the first protruding part 283 or the head of the first screw 283*a* in the z axis direction. In various embodiments, the first elastic member 288 may be in a compressed state in the unfolded state of FIG. 12, and may be in a prolonged state in the fully folded state of FIG. 13 as compared with the unfolded state. For example, the first elastic member 288 may be a further compressed state in the unfolded state and the fully folded state as compared with an equilibrium state. In an embodiment, the first elastic member 288 may be configured to be supported by the first stepped portion 2363 and press the first flange 283*b* of the first protruding part 283 in the −z axis direction in the unfolded state. Accordingly, the center bar 280 may be moved by a specific height "h" in the −z axis direction in the fully folded state, and may provide a space, in which the folded area 143 of the display 140 is located, in the folded state (e.g., FIG. 2B) or the fully folded state (e.g., FIG. 2C).

In an embodiment, the second elastic member 289 may be disposed to surround at least a portion of the second protruding part 284. One side of the second elastic member 289 may be supported by the second flange 284*b* of the second protruding part 284 or the head of the second screw 284*a*, and an opposite side thereof may be supported by the second stepped portion 2383 of the second hole 2381 of the second fixing member 238. For example, the second stepped portion 2383 may face the second flange 284*b* of the second protruding part 284 or the head of the second screw 284*a* in the z axis direction. In various embodiments, the second elastic member 289 may be in a compressed state in the unfolded state of FIG. 12, and may be in a prolonged state in the fully folded state of FIG. 13 as compared with the unfolded state. For example, the second elastic member 289 may be a further compressed state in the unfolded state and the fully folded state as compared with an equilibrium state. In an embodiment, the second elastic member 289 may be configured to be supported by the second stepped portion 2383 and press the second flange 284*b* of the second protruding part 284 in the −z axis direction in the unfolded state. Accordingly, the center bar 280 may be moved by the specific height "h" in the −z axis direction in the fully folded state, and may provide a space, in which the folding area (e.g., the folding area 143 of FIG. 2B) of the display (e.g., the display 140 of FIG. 2B) is located, in the folded state (e.g., FIG. 2B) or the fully folded state (e.g., FIG. 2C).

In an embodiment, the first inclined protrusion 281 may include the third inclined surface 281*a* that at least partially contacts the first inclined surface 264 of the first link structure 260. The third inclined surface 281*a* may be formed to be inclined in the −z axis direction as it goes in the first axial direction ①. The third inclined surface 281*a* and the first inclined surface 264 may at least partially surface-contact each other. In various embodiments, an inclination direction of the third inclined surface 281*a* may be related to a direction of the first inclined surface 264 of the first link structure 260 and a movement direction of the first link structure 260. For example, the third inclined surface 281*a* may be inclined such that the center bar is moved in the −z axis direction in the folding operation. For example, the inclination directions of the third inclined surface 281*a* and the first inclined surface 264 may be variously provided according to the movement direction of the first link structure 260.

In an embodiment, the second inclined protrusion 282 may include the fourth inclined surface 282*a* that at least partially contacts the second inclined surface 274 of the second link structure 270. The fourth inclined surface 282*a* may be formed to be inclined in the −z axis direction as it goes in the first axial direction ①. The fourth inclined surface 282*a* and the second inclined surface 274 may at least partially surface-contact each other. In various embodiments, an inclination direction of the fourth inclined surface 282*a* may be related to a direction of the second inclined surface 274 of the second link structure 270 and a movement direction of the second link structure 270. For example, the fourth inclined surface 282*a* may be inclined such that the center bar 280 is moved in the −z axis direction in the folding operation. For example, the inclination directions of the fourth inclined surface 282*a* and the second inclined surface 274 may be variously provided according to the movement direction of the second link structure 270.

In an embodiment, the hinge structure 200 may be folded from the unfolded state illustrated in FIG. 12 to the folded state illustrated in FIG. 13. In the folding operation, the first rotation structure 210, the first arm part 240, and the first arm shaft 240S may be rotated in the clockwise direction. In the folding operation, the second rotation structure 220, the second arm part 250, and the second arm shaft 250S may be rotated in the counterclockwise direction. Referring to FIGS. 10 and 11 above, the first link structure 260 may be moved in the second axial direction ② by the first guide pin 248 and the third guide pin 258. The compressed first elastic member 288 may press the first flange 283*b* of the first protruding part 283 in the −z axis direction. Then, the first inclined surface 264 may be moved in the second axial direction ② along the third inclined surface 281*a*, and the third inclined surface 281*a* may be moved in the −z axis direction along the first inclined surface 264. In this way, the center bar 280 may be moved in the −z axis direction by pressing the first elastic member 288 and moving the first inclined surface 264 of the first link structure 260. Referring to FIGS. 10 and 11 above, the second link structure 270 may be moved in the first axial direction ① by the second guide pin 249 and the fourth guide pin 259. The compressed second elastic member 289 may press the second flange 284*b* of the second protruding part 284 in the −z axis direction. Then, the second inclined surface 274 may be moved in the first axial direction ① along the fourth inclined surface 282*a*, and the fourth inclined surface may be moved in the −z axis direction along the second inclined surface 274. In this way, the center bar 280 may be moved in the −z axis direction by pressing the second elastic member 289 and moving the second inclined surface 274 of the second link structure 270. In an embodiment, the center bar 280 may be moved by the specific height "h" in the −z axis direction in the folding operation, and thus, a space, in which the folding area (e.g., the folding area 143 of FIG. 2B) of the display (e.g., the display 140 of FIG. 2B) is accommodated, may be provided.

In an embodiment, the hinge structure 200 may be folded from the fully folded state illustrated in FIG. 13 to the unfolded state illustrated in FIG. 12. In the unfolding operation, the first rotation structure 210, the first arm part 240, and the first arm shaft 240S may be rotated in the counterclockwise direction. In the unfolding operation, the second rotation structure 220, the second arm part 250, and the second arm shaft 250S may be rotated in the clockwise direction.

Referring to FIGS. 10 and 11 above, the first link structure 260 may be moved in the first axial direction ① by the first guide pin 248 and the third guide pin 258. Through movement of the first link structure, the first inclined surface 264 may press the third inclined surface 281*a* in the z axis direction. Then, the relatively prolonged first elastic member 288 may be gradually compressed while the unfolding operation is performed. The first inclined surface 264 may be moved in the first axial direction ① along the third inclined surface 281*a*, and the third inclined surface 281*a* may be moved in the z axis direction along the first inclined surface 264. In this way, the center bar 280 may be moved in the z axis direction through movement of the first inclined surface 264 of the first link structure 260. Referring to FIGS. 10 and 11 above, the second link structure 270 may be moved in the second axial direction ② by the second guide pin 249 and the fourth guide pin 259. Through movement of the second link structure 270, the second inclined surface 274 may press the fourth inclined surface 282*a* in the z axis direction. Then, the relatively prolonged second elastic member 289 may be gradually compressed while the unfolding operation is performed. The second inclined surface 274 may be moved in the second axial direction ② along the fourth inclined surface 282*a*, and the fourth inclined surface 282*a* may be moved in the z axis direction along the second inclined surface 274. In this way, the center bar 280 may be moved in the z axis direction through movement of the second inclined surface 274 of the second link structure 270. In an embodiment, the center bar 280 may be moved in the z axis direction in the unfolding operation, and thus, may support a rear surface of the folding area 143 of the display 140 by a flat surface in the unfolded state.

In various embodiments, the inclined surfaces 264 and 274 of the link structures 260 and 270 may be inclined more upwards in the z axis direction as it goes in the movement directions of the link structures 260 and 270 during the folding operation. For example, the first inclined surface 264 of the first link structure 260 may be inclined more upwards in the z axis direction as it goes in the second axial direction ②, and the second inclined surface 274 of the second link structure 270 may be inclined more upwards in the z axis direction as it goes in the first axial direction ①.

In various embodiments, the first inclined surface 264 and the third inclined surface 281*a* may be inclined to at least partially surface-contact each other. In various embodiments, an inclination angle of the first inclined surface 264 may be determined in consideration of an axial displacement of the first link structure 260 and a z axis direction displacement of the center bar. For example, inclination angles of the first inclined surface 264 and the third inclined surface 281*a* may be $$\theta a = \tan^{-1}\frac{h}{d1}$$

so that the center bar 280 is moved by the specific height "h" in the z axis direction when the first link structure 260 is moved by a first distance.

In various embodiments, the second inclined surface 274 and the fourth inclined surface 282*a* may be inclined to at least partially surface-contact each other. In various embodiments, an inclination angle of the second inclined surface 274 may be determined in consideration of an axial displacement of the second link structure 270 and a z axis direction displacement of the center bar 280. For example, inclination angles of the second inclined surface 274 and the fourth inclined surface 282*a* may be $$\theta b = \tan^{-1}\frac{h}{d2}$$

so that the center bar is moved by the specific height "h" in the z axis direction when the second link structure 270 is moved by the second distance d2.

As described above, the first distance d1 and the second distance d2 may be different, and thus, the inclination angle of the first inclined surface 264 and the inclination angle of the second inclined surface 274 may be different.

FIG. 14 is a view illustrating the link structure of the hinge structure in the unfolded state according to an embodiment of the disclosure. FIG. 15 is a view illustrating the link structure of the hinge structure in the fully folded state according to an embodiment of the disclosure.

In an embodiment, the center bar 280 may be configured to maintain a horizontal state in the unfolded state and the folded state (e.g., the fully folded state of FIG. 15). For example, referring to a cross-sectional view, the center bar 280 may be configured such that a normal vector of a surface that faces the rear surface of the display (e.g., the display 140 of FIG. 1) substantially faces the z axis direction. In an embodiment, the center bar 280 may be moved while maintaining a horizontal state in the folding operation and the unfolding operation.

In an embodiment, the center bar 280 may include a first area 280-1, in which the first inclined protrusion 281 is formed, and a second area 280-2, in which the second inclined protrusion 282 is formed. The first area 280-1 and the second area 280-2 may be configured to have the same height in an arbitrary state such that the center bar 280 is maintained horizontal. For example, in the unfolded state of FIG. 14, the fully folded state of FIG. 15, and an arbitrary folded state between the unfolded state and the fully folded state, the first area 280-1 and the second area 280-2 of the center bar 280 may have the same height in the z axis direction.

Referring to FIG. 14, in the unfolded state, the first area 280-1 and the second area 280-2 of the center bar 280 may have a first height h1 from a reference line. Referring to the cross-sectional area, the first inclined protrusion 281 and the second inclined protrusion 282 of the center bar 280 may have the same z axis direction height in the unfolded state.

Referring to FIG. 15, in the fully folded state, the first area 280-1 and the second area 280-2 of the center bar 280 may have a second height h2 from the reference line. Referring to the cross-sectional area, the first inclined protrusion 281 and the second inclined protrusion 282 of the center bar 280 may have the same z axis direction height in the fully folded state.

In the arbitrary state between the unfolded state and the fully folded state, the first area 280-1 and the second area 280-2 of the center bar 280 may have a height that is small than the first height h1 and is larger than the second height h2. For example, the first inclined protrusion 281 and the second inclined protrusion 282 of the center bar 280 may have the same z axis direction height in the arbitrary folded state.

In various embodiments, a difference between the first height h1 and the second height h2 may be substantially the same as the specific height illustrated in FIGS. 12 and 13.

In various embodiments, the first inclined surface 264 of the first link structure 260 and the second inclined surface 274 of the second link structure 270 may have different inclinations. However, the first inclined surface 264 and the second inclined surface 274 may be configured such that the first area 280-1 and the second area 280-2 of the center bar 280 have the same z axis direction height in the arbitrary state between the fully folded state and the unfolded state. To achieve this, the third inclined surface 281*a*, the fourth inclined surface 282*a*, the first inclined surface 264, and the second inclined surface 274 may be substantially flat surfaces.

Figure 16:
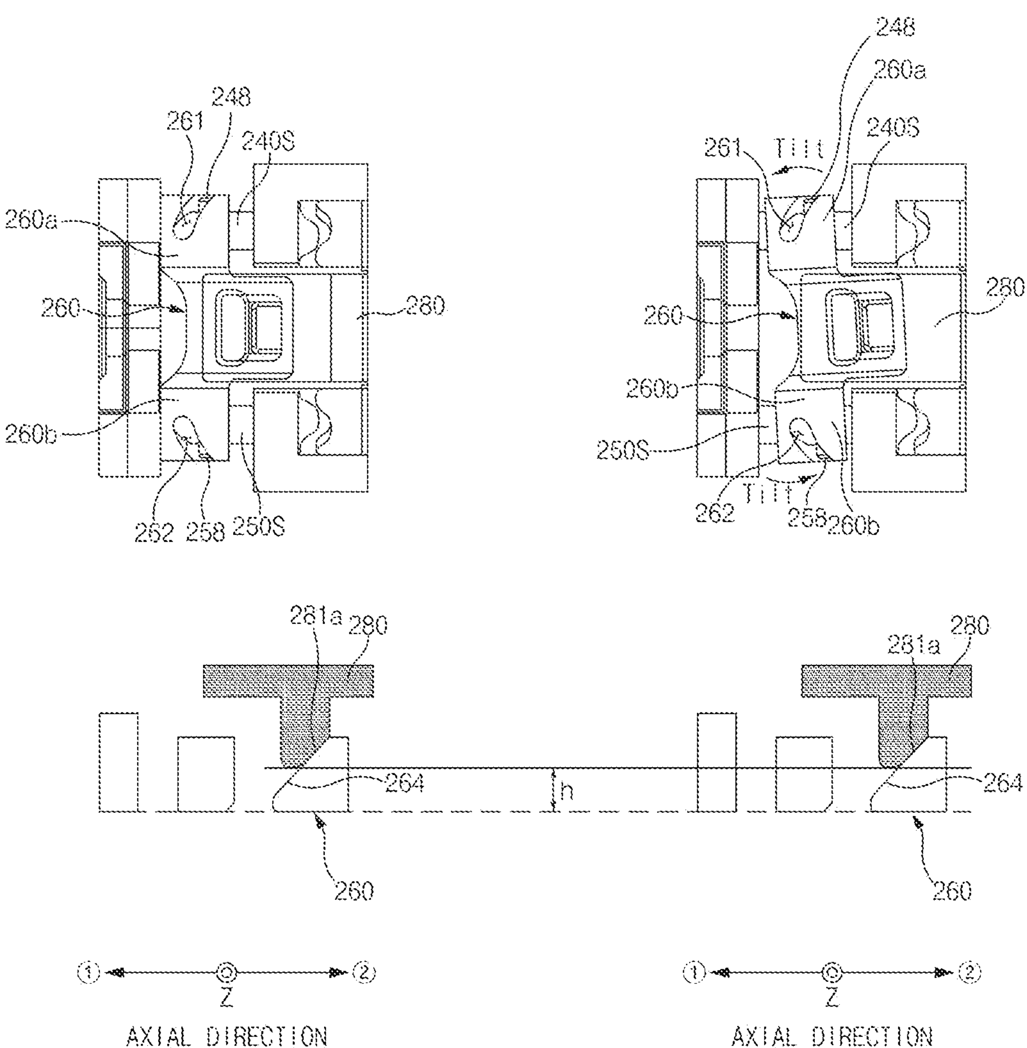
FIG. 16 is a view illustrating maintenance of a horizontal state of a center bar when a hinge structure is tilted according to an embodiment of the disclosure.

FIG. 16 is a view illustrating maintenance of a horizontal state of the center bar when the hinge structure is tilted according to an embodiment of the disclosure. FIG. 6 illustrates only the first link structure, but the following contents may be applied to the second link structure in the same way.

Referring to FIG. 16, the hinge structure 200 may be tilted. The tilting may include a state, in which the first link structure 260 is rotated about an axis that is parallel to the z axis. The tilting may mean that movement distances of the first part 260*a* and the second part 260*b* of the first link structure 260 becomes different due to a difference between rotational angles of the first arm shaft 240S and the second arm shaft 250S. For example, when the user folds or unfolds the first housing 110 and the second housing 120 with uneven forces, the rotational angles of the first arm shaft 240S and the second arm shaft 250S may become different. The difference between the rotational angles may cause a difference between a rotational angle of the first guide pin 248 and a rotational angle of the third guide pin 258, and may cause a difference between axial displacements of the first part 260*a* and the second part 260*b* of the first link structure 260. For example, referring to the drawings, as the first part 260*a* of the first link structure 260 is further moved than the second part 260*b* in the first axial direction ①, the first link structure 260 may be rotated about an axis that is parallel to the z axis in the counterclockwise direction to be tilted.

In an embodiment, the center bar 280 may maintain a horizontal state even when the hinge structure 200 is tilted. The center bar 280 may be supported by the first inclined surface 264 of the first link structure 260 in the z axis direction. Accordingly, the first inclined surface 264 may have a uniform z axis direction height regardless of tilting. The center bar 280 of the hinge structure 200 may be configured to maintain a horizontal state even when the first link structure 260 is tilted.

For example, the hinge structure according to a comparative example includes a gear structure that causes the first rotation structure and the second rotation structure to interlock with each other. The gear structure may include a first gear corresponding to rotation of the first rotation structure, a second gear corresponding to rotation of the second rotation structure, and an idle gear that connects the first gear and the second gear. According to the gear structure, a backlash may occur between the engaged gears. Due to the backlash, the first rotation structure and the second rotation structure may not interlock with each other (e.g., tilting).

The hinge structure 200 according to embodiments disclosed in the disclosure may cause the first rotation structure 210 and the second rotation structure 220 to interlock with each other through the spiral guide grooves 261, 262, 271, and 272 of the link structures 260 and 270 and the guide pins 248, 249, 258, and 259 of the arm shafts 240S and 250S. Accordingly, by the hinge structure including the gear structure, the backlash may be reduced or eliminated. Furthermore, because the link structures 260 and 270 require a relatively small space as compared with the gear structure of the comparative example, the hinge structure 200 and/or the electronic device 100 may be more slimmed.

For example, the hinge structure according to a comparative example includes the center bar that is driven by the first rotation structure and the second rotation structure. In this case, when the first rotation structure and the second rotation structure do not interlock with each other (e.g., tilting), the center bar may not maintain a horizontal state.

The hinge structure 200 according to embodiments disclosed in the disclosure is configured such that the center bar 280 interlocks through the link structures 260 and 270 that are moved in the axial direction in the folding operation and the unfolding operation, and thus the center bar 280 may maintain a horizontal state even when the first rotation structure 210 and the second rotation structure 220 do not interlock with each other (e.g., the tilting).

Figure 17A:
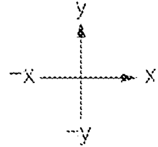
FIG. 17A is a view illustrating an example of a cam structure according to an embodiment of the disclosure.
Figure 17A:
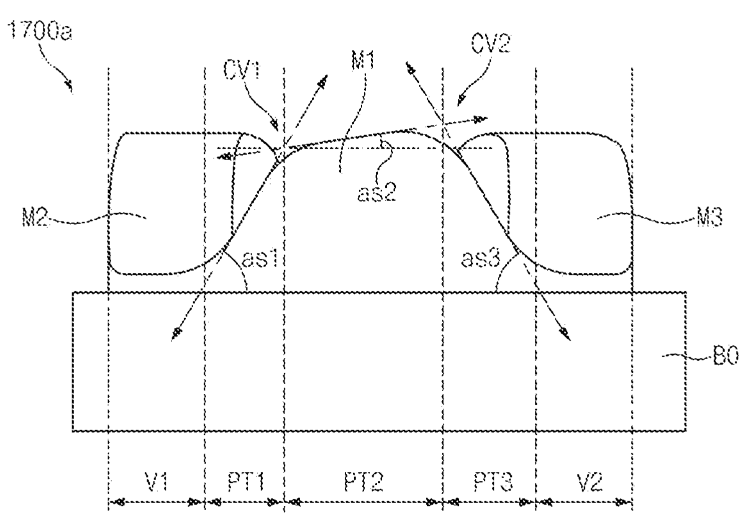
Figure 17B:
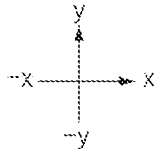
FIG. 17B is a view illustrating an engaging state of cam structures according to an embodiment of the disclosure.
Figure 17B:
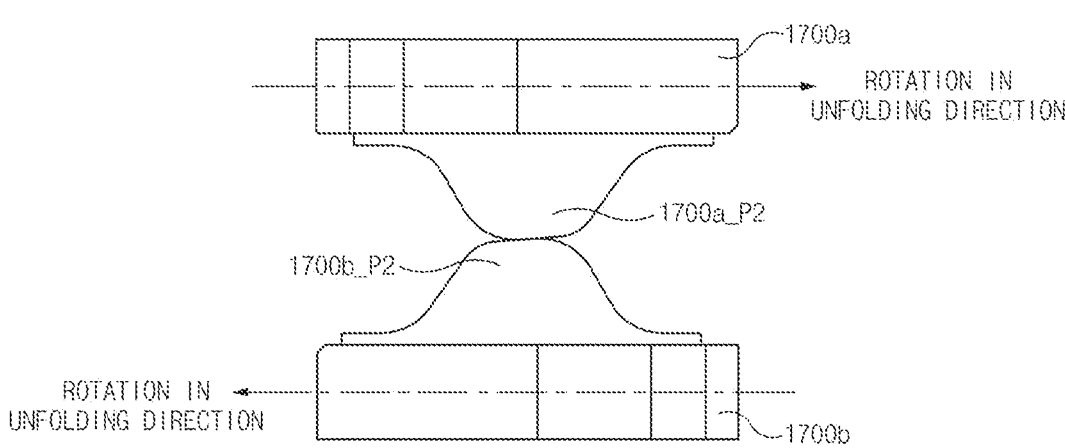

FIG. 17A is a view illustrating an example of the cam structures according to an embodiment of the disclosure. FIG. 17B is a view illustrating an engagement state of the cam structures according to an embodiment of the disclosure.

Prior to the description, a cam 1700*a* according to an embodiment may be applied to at least one of the cam structures described above in FIGS. 4 to 7.

Referring to FIG. 17A, the cam 1700*a* (or the cam structure) according to an embodiment may include a cam support part B0, a plurality of mountains M1, M2, and M3, and a plurality of valleys V1 and V2. The illustrated drawings suggest that the three mountains M1, M2, and M3 and the two valleys V1 and V2 (a valley covered by a first mountain M1 is not illustrated), the disclosure is not limited thereto. For example, the cam 1700*a* may have a structure including two or more cams and valleys. All of the plurality of mountains M1, M2, and M3 may have the same structure. Alternatively, at least one of the plurality of mountains M1, M2, and M3 may be different from the others. For example, as illustrated, a second part PT2 corresponding to a center of at least one mountain may have a structure having a specific inclination angle (an inclination angle that is larger than 0 degrees, for example, around 5 degrees), and a central part of a remaining at least one mountain may have a flat structure.

According to an embodiment, at least one of the plurality of mountains M1, M2, and M3, for example, the first mountain M1, as illustrated, may include a first part PT1 having a first inclination angle as1, the second part PT2 having a second inclination angle as2, and a third part PT3 having a third inclination angle as3. One side (e.g., a −x axis end) of the first part PT1 may be connected to one side (e.g., an x axis end) of a first valley V1, and an opposite side (e.g., an x axis end) of the first part PT1 may be connected to one side (e.g., a −x axis end) of the second part PT2. The first part PT1, for example, may have a ridge having the first inclination angle as1 with respect to the x axis. The first inclination angle as1 may include an acute angle that is smaller than 90 degrees from the −x axis to the x axis direction with respect to the y axis.

One side (e.g., a −x axis end) of the second part PT2 may be connected to an opposite side (e.g., an x axis end) of the first part PT1, and an opposite side (e.g., an x axis end) of the second part PT2 may be connected to one side (e.g., a −x axis end) of the third part PT3. The second part PT2 may further protrude than the first part PT1 and the third part PT3 in the y axis. A border area of the first part PT1 and the second part PT2 may be rounded at a first curvature CV1. The second part PT2 may have the second inclination angle as2 with respect to the x axis. The second inclination angle as2 may include an acute angle that is smaller than 90 degrees from the −x axis to the x axis direction with respect to the y axis, and an absolute angle of the second inclination angle as2 may be smaller than an absolute angle of the first inclination angle as1.

One side (e.g., a −x axis end) of the third part PT3 may be connected to an opposite side (e.g., an x axis end) of the second part PT2, and an opposite side (e.g., an x axis end) of the third part PT3 may be connected to one side (e.g., a −x axis end) of a second valley V2. The third part PT3 may be formed to have a specific inclination, by which it is inclined from the second part PT2 in the x axis. A border area of the second part PT2 and the third part PT3 may be rounded at a second curvature CV2. The second curvature CV2 may have a value that is smaller than the first curvature CV1 (e.g., the first curvature is gentler than the second curvature CV2). The third part PT3 may have the third inclination angle as3 with respect to the x axis. The third inclination angle as3 may include an acute angle that is smaller than 90 degrees from the x axis to the −x axis direction with respect to the y axis, and an absolute angle of the third inclination angle as3 may be greater than an absolute angle of the second inclination angle as2. According to various embodiments, the absolute value of the third inclination angle as3 may be the same as or larger than the absolute angle of the first inclination angle as1.

Referring to FIG. 17B, the cam shape illustrated in FIG. 17A may be applied to the at least cam or the at least one cam structure described above in FIGS. 2A to 2C, 3 to 7, 8A to 8C, 9A to 9C, and 10 to 16. For example, in the illustrated drawings, a protrusion of the cam 1700*a* may be disposed to protrude from the y axis to the −y axis direction, and a protrusion of a cam structure 1700*b* may be disposed to protrude from the −y axis to the y axis direction. Alternatively, a recessed part of the cam 1700*a* and a recessed part of the cam structure 1700*b* may be disposed to face each other. At least a portion of a second part 1700*a*_P2 of the cam 1700*a* and at least a portion of a second part 1700*b*_P2 of the cam structure 1700*b* may contact each other while the electronic device (e.g., the electronic device 100 of FIGS. 2A to 2C) is in a free-stop section (a section, in which the electronic device is hold in a specific angle range by a frictional force between the cam 1700*a* and the cam structure 1700*b*). According to an embodiment, when the electronic device is in the free-stop state described in FIG. 15 or 16, the display (the display 160 of FIG. 1 or 2A to 2C) may exert a repulsive force for restoring the display to the unfolded state (the state of FIG. 14).

According to an embodiment, the cam 1700*a* may be pushed in the x axis direction by the restoring force of the display (e.g., a repulsive force of the display is applied in the counterclockwise direction), and the cam structure 1700*b* may be pushed in the −x axis direction by the restoring force of the display (e.g., a repulsive force of the display is applied in the clockwise direction). In this process, because the second part 1700*a*_P2 of the cam 1700*a* and the second part 1700*b*_P2 of the cam structure 1700*b* contact each other while having the second inclination angle as2 described above, the cam 1700*a* and the cam structure 1700*b* may offset at least a portion of the repulsive force (or the restoring force) in the unfolding direction of the display whereby the pushing in the free-stop state that may occur regardless of an intention of the user (e.g., an angle between the first housing (e.g., the first housing 110 of FIG. 1 or 2A to 2C) and the second housing (e.g., the second housing 120 of FIG. 1 or 2A to 2C) is changed) may be restrained. According to various embodiments, as in FIG. 15 or 16 above, the electronic device may be in a holding state (or a free-stop state) at a specific angle. In this case, the electronic device, as illustrated, may be disposed to be engaged with the cam 1700*a* and the cam structure 1700*b*, and the repulsive force or the restoring force of the display may offset a force applied to the unfolded state as in FIG. 14. FIG. 17B exemplifies a structure, in which apexes of the mountains of both of the cam 1700*a* and the cam structure 1700*b* have the second inclination angle as2, but the disclosure is not limited thereto. For example, the second part PT2 having the second inclination angle as2 may be formed in only at least one of the cam 1700*a* or the cam structure 1700*b*.

Meanwhile, with reference to rotation in the unfolding direction, FIG. 17B is illustrated with reference to a direction, in which the cam 1700*a* is rotated in the −x axis (or the left side) to the x axis (or the right side) direction, but the disclosure is not limited thereto. For example, according to a design aspect of the electronic device, a direction, in which the cam 1700*a* is rotated from the x axis to the −x axis direction, may be a direction, in which the display is operated from the folded state to the unfolded state.

An electronic device according to embodiments disclosed in the disclosure may include a first housing 110 and a second housing 120, a hinge structure 200 connected to the first housing 110 and the second housing 120 such that the first housing 110 is rotated about a first rotation axis R1 that is parallel to an axial direction thereof and the second housing 120 is rotated about a second rotation axis R2 that is parallel to the axial direction, and a display 140 disposed to cover the first housing 110, the second housing 120, and the hinge structure 200, in which the display 140 includes a folding area 143 that is flat in an unfolded state and is curved in a folded state, and the hinge structure 200 may include a first arm shaft 240S extending in a direction that is parallel to the axial direction, connected to a fixing structure 230 to be rotatable, and rotated in correspondence to rotation of a first rotation structure 210, a second arm shaft 250S extending in a direction that is parallel to the axial direction, connected to the fixing structure 230 to be rotatable, and rotated in correspondence to rotation of a second rotation structure 220, a first link structure 260 coupled to the first am shaft 240S and the second arm shaft 250S, in which the first link structure 260 is configured to be linearly moved in the axial direction according to rotation of the first arm shaft 240S and the second arm shaft 250S, and a center bar 280 at least partially overlapping the folding area 143 of the display 140 when viewed from a top, wherein the center bar 280 is coupled to the first link structure 260 and is configured to be moved in a direction that is perpendicular to the axial direction in correspondence to linear movement of the first link structure 260.

In various embodiments, an extension direction of the folding area 143 extends in the axial direction.

In various embodiments, the first arm shaft 240S may include a first guide pin 248 protruding from an outer surface thereof, the second arm shaft 250S may include a third guide pin 258 protruding from an outer surface thereof, and the first link structure 260 may include a first part 260*a* coupled to the first arm shaft 240S, and in which the first guide pin 248 is at least partially accommodated, a second part 260*b* coupled to the second arm shaft 250S, and in which the third guide pin 258 is at least partially accommodated, and a first central part 260*c* connecting the first part 260*a* and the second part 260*b*.

In various embodiments, a first guide groove 261 may extend by a first length in an extension direction of the first arm shaft 240S and extends at a first angle in a circumferential direction of the first arm shaft 240S, a second guide groove 262 may extend by a second length in an extension direction of the second arm shaft 250S and may extend at a second angle in a circumferential direction of the second arm shaft 250S, the first length and the second length may be substantially the same, and the first angle and the second angle may have substantially the same size and opposite directions.

In various embodiments, when a direction that is perpendicular to the axial direction while facing the folding area 143 from the center bar 280 in the unfolded state is defined as a first direction (e.g., the z axis direction), the center bar 280 may be configured to be moved in the first direction in an unfolding operation of moving the hinge structure 200 from the folded state to the unfolded state, and the center bar 280 may be configured to be moved in a second direction (e.g., the −z axis direction) that is opposite to the first direction in a folding operation of moving the hinge structure 200 from the unfolded state to the folded state.

In various embodiments, the first link structure 260 may include a first part 260*a* coupled to the first arm shaft 240S, a second part 260*b* coupled to the second arm shaft 250S, and a first central part 260*c* connecting the first part 260*a* and the second part 260*b*, a first opening 263 may be formed in the first central part 260*c* of the first link structure 260, a side wall of the first opening 263 may include a first inclined surface 264 having a specific inclination angle with respect to the axial direction, the center bar 280 may include a first inclined protrusion 281, a part of which is located in an interior of the first opening 263, the first inclined protrusion 281 may include a third inclined surface 281*a* that at least partially contacts the first inclined surface 264, and the first inclined surface 264 may press the third inclined surface 281*a* such that the center bar 280 is moved toward the first direction or the second direction as the first link structure 260 is linearly moved in the axial direction.

In various embodiments, the hinge structure 200 may further include the fixing structure 230 that supports the first arm shaft 240S and the second arm shaft 250S, and a second fixing member 238 supporting the first arm shaft 240S and the second arm shaft 250S and disposed at a location that is spaced apart from the fixing structure 230 in the axial direction, the center bar 280 may include a first protruding part 283, at least a portion of which extends into an interior of a first hole 2361 formed in the fixing member 236, and a first elastic member 288 disposed in the first protruding part 283 and that provides an elastic force to the center bar 280, and the first elastic member 288 may be configured to be compressed in the unfolding operation and to be prolonged in the folding operation.

In various embodiments, the hinge structure 200 may include a second link structure 270 disposed at a location that is spaced apart from the first link structure 260 in the axial direction, and that is linearly moved in the axial direction, the second link structure 270 may include a third part 270*a* coupled to the first arm shaft 240S, and in which a second guide pin 249 of the first arm shaft 240S is at least partially accommodated, a fourth part 270*b* coupled to the second arm shaft 250S, and in which a fourth guide pin 259 of the second arm shaft 250S is at least partially accommodated, and a second central part 270*c* connecting the third part 270*a* and the fourth part 270*b*, a second opening 273 may be formed in the second central part 270*c*, a side wall of the second opening 273 may include a second inclined surface 274 having a specific inclination angle with respect to the axial direction, at least a portion of the center bar 280 may include a second inclined protrusion 282 located in an interior of the second opening 273, and the second inclined protrusion 282 may include a fourth inclined surface 282*a* that at least partially contacts the second inclined surface 274.

In various embodiments, the second link structure 270 may be moved in a direction that is the same as or opposite to that of the first link structure 260, and the first link structure 260 may be configured to press the center bar 280 in a direction that is the same as a direction, in which the center bar 280 is pressed.

In various embodiments, the hinge structure 200 may further include the fixing structure 230 that supports the first arm shaft 240S and the second arm shaft 250S, and a second fixing member 238 supporting the first arm shaft 240S and the second arm shaft 250S and disposed at a location that is spaced apart from the fixing structure 230 in the axial direction, the hinge structure 200 may further include a first arm part 240 coupled to the first arm shaft 240S to be rotated together with the first arm shaft 240S, and a second arm part 250 coupled to the second arm shaft 250S to be rotated together with the second arm shaft 250S, and the link structure may be configured such that the first part 260*a* is located between the first arm part 240 and the fixing structure 230 and the second part 260*b* is located between the second arm part 250 and the fixing structure 230.

In various embodiments, the first link structure 260 may be configured to at least partially contact any one of the first arm part 240 and the second arm part 250 or the fixing structure 230 in the unfolded state.

In various embodiments, the hinge structure 200 may include first cam structures 244, 245, 291, and 293 coupled to the first arm shaft 240S, third and fourth elastic members 295*a* and 295*b* compressed or prolonged by the first cam structures 244, 245, 291, and 293, second cam structures 254, 255, 292, and 294 coupled to the second arm shaft 250S, and fifth and sixth elastic members 295*c* and 295*d* compressed or prolonged by the second cam structures 254, 255, 292, and 294, the first cam structures 244, 245, 291, and 293 may include first and second arm cams 244 and 245 formed in the first arm part 240 and rotated together with the first arm part 240, and first and third linear cams 291 and 293 coupled to the first arm shaft 240S to be linearly moved, and engaged with the first and second arm cams 244 and 245, and the second cam structures 254, 255, 292, and 294 may include third and fourth arm cams 254 and 255 formed in the second arm part 250 and rotated together with the second arm part 250, and second and fourth linear cams 292 and 294 coupled to the second arm shaft 250S to be linearly moved, and engaged with the third and fourth arm cams 254 and 255.

A hinge structure according to embodiments disclosed in the disclosure may include a fixing structure 230, a first rotation structure 210 coupled to a first guide rail 232 of the fixing structure 230 to be rotated about a first rotation axis R1, a first arm shaft 240S extending in a direction that is parallel to the first rotation axis R1 and connected to the fixing structure 230 to be rotatable, wherein the first arm shaft 240S includes a first guide pin 248 protruding from an outer surface thereof, a first arm part 240 coupled to the first arm shaft 240S to be rotated about the first arm shaft 240S, and connected to the first rotation structure 210 to be slid, a second rotation structure 220 coupled to a second guide rail 234 of the fixing structure 230 to be rotated about a second rotation axis R2, a second arm shaft 250S extending in a direction that is parallel to the second rotation axis R2 and connected to the fixing structure 230 to be rotatable, wherein the second arm shaft 250S includes a third guide pin 258 protruding from an outer surface thereof, a second arm part 250 coupled to the second arm shaft 250S to be rotated about the second arm shaft 250S, and connected to the second rotation structure 220 to be slid, and a first link structure 260 including a first part 260*a*, in which a first guide groove 261, through which the first arm shaft 240S passes and in which the first guide pin 248 is at least partially accommodated, is formed, a second part 260*b*, in which a second guide groove 262, through which the second arm shaft 250S passes and in which the third guide pin 258 is at least partially accommodated, is formed, and a first central part 260*c* connecting the first part 260*a* and the second part 260*b*.

In various embodiments, the first link structure 260 may be configured to be linearly moved in extension directions of the first arm shaft 240S and the second arm shaft 250S when the first arm shaft 240S and/or the second arm shaft 250S are rotated.

In various embodiments, the first link structure 260 may be configured to cause the first arm shaft 240S and the second arm shaft 250S to interlock with each other when the first arm shaft 240S and/or the second arm shaft 250S are rotated in opposite directions.

In various embodiments, the first guide groove 261 and the second guide groove 262 may have spiral shapes.

In various embodiments, the first guide pin 248 and the third guide pin 258 may be configured to press the link structure in the same direction when the first arm shaft 240S is rotated in a first rotational direction and the second arm shaft 250S is rotated in a second rotational direction that is opposite to the first rotational direction.

In various embodiments, the first guide groove 261 may extend by a first length in an extension direction of the first arm shaft 240S and may extend at a first angle in a circumferential direction of the first arm shaft 240S, the second guide groove 262 may extend by a second length in an extension direction of the second arm shaft 250S and may extend at a second angle in a circumferential direction of the second arm shaft 250S, the first length and the second length may be substantially the same, and the first angle and the second angle may have substantially the same size and opposite directions.

In various embodiments, the hinge structure may further include a center bar 280 at least partially overlapping the central part of the first link structure 260, and the center bar 280 may be configured to move in conjunction with rotation of the first arm shaft 240S and the second arm shaft 250S through the first link structure 260.

In various embodiments, a first opening 263 may be formed in the first central part 260*c* of the first link structure 260, a portion of a side surface of the first opening 263 may include a first inclined surface 264, the center bar 280 may include a first inclined protrusion 281 at least partially accommodated in an interior of the first opening 263, and the first inclined protrusion 281 may include a third inclined surface 281*a* that at least partially contacts the first inclined surface 264.

In various embodiments, the hinge structure may be configured such that the first link structure 260 is linearly moved along the first arm shaft 240S and the second arm shaft 250S and the center bar 280 is moved in a direction that is perpendicular to the linear movement direction in correspondence to the linear movement, in a folding operation and an unfolding operation.

In various embodiments, the center bar 280 moves in conjunction with movement of the link structure 260 and 270 such that the center bar 280 maintains a horizontal state while a first housing 110 and a second housing 120 of an electronic device implementing the hinge structure are tilted.

In various embodiments, the hinge structure may further include a first torque structure 201 providing a first torque to the first arm shaft 240S; and a second torque structure 202 providing a second torque to the second arm shaft 250S, wherein the first torque structure 201 and the second torque structure 202 further provide frictional forces corresponding to a restoring torque, by which a display 140 is intended to return to a flat state, to the display 140.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it denotes that the element may be coupled with the other element directly (e.g., wiredly), wirelessly, or via a third element.

According to the situation, an expression "adapted to or configured to," if used in this disclosure, may be used interchangeably with the expression "suitable for," "having the capacity to," "adapted to," "made to," "capable of," or "designed to" in hardware or software, for example. The expression "a device configured to" may mean that the device is "capable of" operating together with another device or other components. A "processor set to (or configured to) perform A, B, and C" may mean a dedicated processor (e.g., an embedded processor) for performing corresponding operations or a generic-purpose processor (e.g., a central processing unit (CPU) or an application processor (AP)) that performs corresponding operations by executing one or more programs stored in a memory device (e.g., memory), for example.

As used in connection with various embodiments of the disclosure, the term "module" may include a unit implemented in hardware, software, or firmware, and may interchangeably be used with other terms, e.g., "logic," "logic block," "part," or "circuitry." A module may be a single integral component, or a minimum unit or part thereof, adapted to perform one or more functions. The "module" may be implemented mechanically or electronically and may include an application-specific integrated circuit (ASIC) chip, field-programmable gate arrays (FPGAs), or a programmable-logic device for performing some operations.

At least a part of an apparatus (e.g., modules or functions thereof) or a method (e.g., operations) in various embodiments may be implemented by instructions stored in computer-readable storage media (e.g., memory) in the form of a program module. The instructions, when executed by a processor (e.g., a processor), may cause the processor to perform functions corresponding to the instructions. The computer-readable storage media may include a hard disk, a floppy disk, a magnetic media (e.g., a magnetic tape), an optical media (e.g., compact disc read only memory (CD-ROM), digital versatile disc (DVD), magneto-optical media (e.g., a floptical disk)), an embedded memory, or the like. The instructions may include a code made by a compiler or a code executable by an interpreter.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a first housing;

a second housing;

a hinge structure connected to the first housing and the second housing, the first housing being rotatable about a first rotation axis and the second housing being rotatable about a second rotation axis, the first rotation axis and the second rotation axis being parallel to an axial direction; and a display covering the first housing, the second housing, and the hinge structure, wherein the display includes a folding area that is flat in an unfolded state and curved in a folded state, and wherein the hinge structure comprises:

a fixing structure;

a first arm shaft extending in a direction that is parallel to the axial direction, the first arm shaft being connected to the fixing structure to be rotatable, the first arm shaft being rotated in correspondence to a rotation of a first rotation structure;

a second arm shaft extending in the direction that is parallel to the axial direction, the second arm shaft being connected to the fixing structure to be rotatable, the second arm shaft being rotated in correspondence to a rotation of a second rotation structure;

a link structure coupled to the first arm shaft and the second arm shaft, the link structure being configured to move linearly in the axial direction according to a rotation of the first arm shaft and the second arm shaft; and a center bar at least partially overlapping the folding area of the display when viewed from above, the center bar being coupled to the link structure and movable in a direction that is perpendicular to the axial direction in correspondence to the link structure moving linearly in the axial direction.

2. The electronic device of claim 1, wherein the first arm shaft includes a first guide pin protruding from an outer surface thereof, wherein the second arm shaft includes a third guide pin protruding from an outer surface thereof, and wherein the link structure comprises:

a first part coupled to the first arm shaft, the first guide pin being at least partially accommodated in the first part;

a second part coupled to the second arm shaft, the third guide pin being at least partially accommodated in the second part; and a central part connecting the first part and the second part.

3. The electronic device of claim 1, wherein a first guide groove extends a first length in an extension direction of the first arm shaft and extends at a first angle in a circumferential direction of the first arm shaft, wherein a second guide groove extends a second length in an extension direction of the second arm shaft and extends at a second angle in a circumferential direction of the second arm shaft, wherein the first length and the second length are substantially a same length, and wherein the first angle and the second angle have substantially a same size angle and face opposite directions.

4. The electronic device of claim 1, wherein, when a direction that is perpendicular to the axial direction while facing the folding area from the center bar in the unfolded state is defined as a first direction:

the center bar is movable in the first direction in an unfolding operation of moving the hinge structure from the folded state to the unfolded state; and the center bar is movable in a second direction opposite to the first direction in a folding operation of moving the hinge structure from the unfolded state to the folded state.

5. The electronic device of claim 4, wherein the link structure comprises:

a first part coupled to the first arm shaft;

a second part coupled to the second arm shaft; and a central part connecting the first part and the second part, wherein an opening is formed in the central part of the link structure, wherein a side wall of the opening includes a first inclined surface having a specific inclination angle with respect to the axial direction, wherein the center bar includes an inclined protrusion, a part of the inclined protrusion being located in an interior of the opening, wherein the inclined protrusion includes a third inclined surface at least partially contacting the first inclined surface, and wherein the first inclined surface presses the third inclined surface such that the center bar moves toward the first direction or the second direction as the link structure moves linearly in the axial direction.

6. The electronic device of claim 4, wherein the hinge structure further comprises:

the fixing structure supporting the first arm shaft and the second arm shaft; and a fixing member supporting the first arm shaft and the second arm shaft and being disposed at a location that is spaced apart from the fixing structure in the axial direction, wherein the center bar comprises:

a protruding part, at least a portion of the protruding part extending into an interior of a hole formed in the fixing member; and an elastic member disposed in the protruding part and being configured to provide an elastic force to the center bar, and wherein the elastic member is further configured to be compressed in the unfolding operation and prolonged in the folding operation.

7. The electronic device of claim 5, wherein the hinge structure further comprises a second link structure disposed at a location that is spaced apart from the link structure in the axial direction, the second link structure being configured to move linearly in the axial direction, wherein the second link structure comprises:

a third part coupled to the first arm shaft, a second guide pin of the first arm shaft being at least partially accommodated in the third part;

a fourth part coupled to the second arm shaft, a fourth guide pin of the second arm shaft being at least partially accommodated in the fourth part; and a second central part connecting the third part and the fourth part, wherein a second opening is formed in the second central part, wherein a side wall of the second opening includes a second inclined surface having a specific inclination angle with respect to the axial direction, wherein at least a portion of the center bar includes a second inclined protrusion located in an interior of the second opening, and wherein the second inclined protrusion includes a fourth inclined surface at least partially contacting the second inclined surface.

8. The electronic device of claim 7, wherein the second link structure moves in a direction that is one of a same direction or an opposite direction to a moving direction of the link structure, and wherein the link structure is configured to press the center bar in a direction that is a same direction as a direction in which the center bar is pressed by the first inclined surface.

9. The electronic device of claim 1, wherein the fixing structure supports the first arm shaft and the second arm shaft, wherein the hinge structure further comprises:

a fixing member supporting the first arm shaft and the second arm shaft and being disposed at a location that is spaced apart from the fixing structure in the axial direction;

a first arm part coupled to the first arm shaft to be rotated together with the first arm shaft; and a second arm part coupled to the second arm shaft to be rotated together with the second arm shaft, and wherein a first part of the link structure is located between the first arm part and the fixing structure and a second part of the link structure is located between the second arm part and the fixing structure.

10. The electronic device of claim 9, wherein the link structure at least partially contacts any one of the first arm part, the second arm part, or the fixing structure in the unfolded state.

11. The electronic device of claim 9, wherein the hinge structure further comprises:

a first cam structure coupled to the first arm shaft;

a first elastic member compressed or prolonged by the first cam structure;

a second cam structure coupled to the second arm shaft; and a second elastic member compressed or prolonged by the second cam structure, wherein the first cam structure comprises:

a first arm cam formed in the first arm part and rotated together with the first arm part; and a first linear cam coupled to the first arm shaft to be moved linearly, the first linear cam being engaged with the first arm cam, and wherein the second cam structure comprises:

a second arm cam formed in the second arm part and rotated together with the second arm part; and a second linear cam coupled to the second arm shaft to be moved linearly, the second linear cam being engaged with the second arm cam.

12. A hinge structure comprising:

a fixing structure;

a first rotation structure coupled to a first guide rail of the fixing structure to be rotated about a first rotation axis;

a first arm shaft extending in a direction that is parallel to the first rotation axis and being connected to the fixing structure to be rotatable, the first arm shaft including a first guide pin protruding from an outer surface of the first arm shaft;

a first arm part coupled to the first arm shaft to be rotated about the first arm shaft, the first arm part being connected to the first rotation structure to be slid;

a second rotation structure coupled to a second guide rail of the fixing structure to be rotated about a second rotation axis;

a second arm shaft extending in a direction that is parallel to the second rotation axis and connected to the fixing structure to be rotatable, the second arm shaft including a third guide pin protruding from an outer surface of the second arm shaft;

a second arm part coupled to the second arm shaft to be rotated about the second arm shaft, the second arm part being connected to the second rotation structure to be slid; and a link structure comprising:

a first part having formed therein a first guide groove through which the first arm shaft passes and in which the first guide pin is at least partially accommodated;

a second part having formed therein a second guide groove through which the second arm shaft passes and in which the third guide pin is at least partially accommodated; and a central part connecting the first part and the second part.

13. The hinge structure of claim 12, wherein the link structure is configured to move linearly in extension directions of the first arm shaft and the second arm shaft when at least one of the first arm shaft or the second arm shaft is rotated.

14. The hinge structure of claim 12, wherein the link structure is configured to cause the first arm shaft and the second arm shaft to interlock with each other when the first arm shaft and the second arm shaft are rotated in opposite directions.

15. The hinge structure of claim 12, wherein the first guide groove and the second guide groove have spiral shapes.

16. The hinge structure of claim 12, wherein the first guide pin and the third guide pin are configured to press the link structure in a same direction when the first arm shaft is rotated in a first rotational direction and the second arm shaft is rotated in a second rotational direction opposite to the first rotational direction.

17. The hinge structure of claim 12, wherein the first guide groove extends a first length in an extension direction of the first arm shaft and extends at a first angle in a circumferential direction of the first arm shaft, wherein the second guide groove extends a second length in an extension direction of the second arm shaft and extends at a second angle in a circumferential direction of the second arm shaft, wherein the first length and the second length are substantially a same length, and wherein the first angle and the second angle have substantially a same size angle and face opposite directions.

18. The hinge structure of claim 12, further comprising:

a center bar at least partially overlapping the central part of the link structure, wherein the center bar is configured to move in conjunction with a rotation of the first arm shaft and the second arm shaft through the link structure.

19. The hinge structure of claim 18, wherein an opening is formed in the central part of the link structure, wherein a portion of a side surface of the opening includes a first inclined surface, wherein the center bar includes an inclined protrusion at least partially accommodated in an interior of the opening, and wherein the inclined protrusion includes a third inclined surface at least partially contacting the first inclined surface.

20. The hinge structure of claim 18, wherein the link structure moves linearly in a linear movement direction along the first arm shaft and the second arm shaft, and wherein, in a folding operation and an unfolding operation, the center bar moves in a direction that is perpendicular to the linear movement direction in correspondence to the link structure moving linearly in the linear movement direction.

21. The hinge structure of claim 18, wherein the center bar moves in conjunction with movement of the link structure such that the center bar maintains a horizontal state while a first housing and a second housing of an electronic device implementing the hinge structure are tilted.

22. The hinge structure of claim 12, further comprising:

a first torque structure providing a first torque to the first arm shaft; and a second torque structure providing a second torque to the second arm shaft, wherein the first torque structure and the second torque structure further provide frictional forces corresponding to a restoring torque, by which a display is intended to return to a flat state, to the display.

* * * * *